(12) United States Patent
Kehler et al.

(10) Patent No.: US 12,079,581 B2
(45) Date of Patent: *Sep. 3, 2024

(54) DIAGNOSING SOURCES OF NOISE IN AN EVALUATION

(71) Applicant: CrowdSmart, Inc., San Francisco, CA (US)

(72) Inventors: Thomas Kehler, San Francisco, CA (US); Markus Guehrs, San Francisco, CA (US); Sonali Sinha, San Francisco, CA (US)

(73) Assignee: CrowdSmart, Inc., San Francisco, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/880,534

(22) Filed: Aug. 3, 2022

(65) Prior Publication Data

US 2023/0067915 A1 Mar. 2, 2023

Related U.S. Application Data

(63) Continuation of application No. 17/492,504, filed on Oct. 1, 2021, now Pat. No. 11,455,474.

(Continued)

(51) Int. Cl.
*G06F 40/30* (2020.01)
*G06F 16/245* (2019.01)
(Continued)

(52) U.S. Cl.
CPC ............ *G06F 40/30* (2020.01); *G06F 16/245* (2019.01); *G06F 18/214* (2023.01); *G06F 18/22* (2023.01); *G06F 18/24155* (2023.01); *G06F 18/295* (2023.01); *G06N 3/047* (2023.01); *G06N 3/08* (2013.01); *G06N 5/01* (2023.01); *G06N 5/02* (2013.01); *G06N 5/022* (2013.01); *G06N 5/04* (2013.01); *G06N 7/01* (2023.01); *G06N 20/00* (2019.01); *G06T 15/08* (2013.01); *G06T 2200/24* (2013.01)

(58) Field of Classification Search
CPC .......... G06N 20/00; G06N 5/003; G06N 5/04; G06N 7/005
See application file for complete search history.

(56) References Cited

PUBLICATIONS

Nicholson, Ann E., et al. "Bard: A structured technique for group elicitation of Bayesian networks to support analytic reasoning." arXiv preprint arXiv:2003.01207 (2020). (Year: 2020).*

(Continued)

*Primary Examiner* — Eric Nilsson
(74) *Attorney, Agent, or Firm* — Pillsbury Winthrop Shaw Pittman, LLP

(57) ABSTRACT

Provided are processes of balancing between exploration and optimization with knowledge discovery processes applied to unstructured data with tight interrogation budgets. A process may include determining a relevance probability distribution of responses and scores as an explanatory diagnostic. A distribution curve may be determined based on a probabilistic graphical network and a result may be audited relative to the distribution curve to determine noise measurements. The distribution curve may be determined based on a distribution of posterior predictions of entities to score ranking entity bias and noisiness of ranking entity feedback.

20 Claims, 17 Drawing Sheets

Related U.S. Application Data

(60) Provisional application No. 63/086,542, filed on Oct. 1, 2020.

(51) Int. Cl.

| | | |
|---|---|---|
| *G06F 18/20* | (2023.01) | |
| *G06F 18/214* | (2023.01) | |
| *G06F 18/22* | (2023.01) | |
| *G06F 18/2415* | (2023.01) | |
| *G06N 3/047* | (2023.01) | |
| *G06N 3/08* | (2023.01) | |
| *G06N 5/01* | (2023.01) | |
| *G06N 5/02* | (2023.01) | |
| *G06N 5/022* | (2023.01) | |
| *G06N 5/04* | (2023.01) | |
| *G06N 7/01* | (2023.01) | |
| *G06N 20/00* | (2019.01) | |
| *G06T 15/08* | (2011.01) | |

(56) References Cited

PUBLICATIONS

Flores, M. Julia, et al. "Incorporating expert knowledge when learning Bayesian network structure: a medical case study." Artificial intelligence in medicine 53.3 (2011): 181-204. (Year: 2011).*
Fenton, Norman E., Martin Neil, and Jose Galan Caballero. "Using ranked nodes to model qualitative judgments in Bayesian networks." IEEE Transactions on Knowledge and Data Engineering 19.10 (2007): 1420-1432. (Year: 2007).*

* cited by examiner

DIAGNOSING SOURCES OF NOISE IN AN EVALUATION

CROSS-REFERENCE TO RELATED APPLICATIONS

The present application is a continuation of U.S. Non-Provisional application Ser. No. 17/492,504, filed on 1 Oct. 2021, titled "DIAGNOSING SOURCES OF NOISE IN AN EVALUATION." U.S. Non-Provisional application Ser. No. 17/492,504 claims priority to U.S. Provisional Application No. 63/086,542, filed on 1 Oct. 2020, titled, "BALANCING BETWEEN EXPLORATION AND OPTIMIZATION WITH KNOWLEDGE DISCOVERY PROCESSES." The entire content of each aforementioned filing is hereby incorporated by reference.

BACKGROUND

1. Field

The present disclosure relates generally to artificial intelligence and, more specifically, to balancing between exploration and optimization with knowledge discovery processes applied to unstructured data with tight interrogation budgets.

2. Description of the Related Art

Artificial intelligence may take a variety of forms, with various trade-offs and relative strength. Examples include various forms of machine learning and expert systems. Often, artificial intelligence applications undergo a training phase or other configuration phase in which parameters are configured based on a training set, and then, a run-time phase in which the trained application is used to produce outputs responsive to run-time inputs.

SUMMARY

The following is a non-exhaustive listing of some aspects of the present techniques. These and other aspects are described in the following disclosure.

Some aspects include a computer-implemented process of balancing between exploration and optimization with knowledge discovery processes applied to unstructured data with tight interrogation budgets. Some aspects of example processes may include obtaining, by a computing system, a plurality of natural language texts. A computing system may determine, such as with a natural language processing model, a high-dimensionality vector representation of each text where such high-dimensionality vector representations comprise more than 50 or more than 500 dimensions, and in some examples between 700 and 800 dimensions. A computing system may reduce, such as with an encoder model, each high-dimensionality vector representation to a reduced vector representation having fewer dimensions, such as less than 20 or less than 10 dimensions. Three of the dimensions may correspond to positional data within a 3-Dimensional latent embedding space. A computing system may embed, within the 3-D latent embedding space, each of the reduced vector representations based on their respective positional data and determine at least one region within the 3-D latent embedding space that has a density of vectors below a threshold. Based on the determination, a computing system may update, for the at least one region, a prioritization value to bias selection of a natural language text corresponding to, or identified to, the at least one region.

Some aspects of example processes may include obtaining, with a computer system, a set of options for which rank among the options is to be determined. A computing system may select from the set of options, a first sample including a subset of options from the set of options. A computing system may receive an indication of rank among the options within the first sample of options from a first ranking entity. The test of options may be augmented with new options. For example, a computing system, after receiving at least some indications of rank for other samples from other ranking entities, may augment the set of options with at least one new option. Then, a computing system may select from the set of augmented options a second sample that includes a subset of options from the augmented set of options, and one or more options within the second subset may be new options. The computing system may receive an indication of rank among the options within the second sample of options from a second ranking entity. A probability distribution may be determined by a computing system to estimate performance of each option within the set of options relative to each other option based on the indications of rank for the samples, such to output, by the computer system, an indication of ranked order among the options in the set of options based on the estimates of performance.

Some aspects of example processes may include obtaining, by a computing system, a plurality of features to be evaluated by a plurality of entities. A computing system may select a feature to present to a first subset of the entities. A first plurality of scores and a first plurality of natural language text responses for the feature may be received. A computing system may select the feature and different first subsets of responses from the first responses for the feature to present to a second subset of the entities. A second plurality of scores, a second plurality of natural language text responses for the feature, and a first plurality of rank orderings of responses within respective ones of the first subsets may be received. A time series data set of events that comprises each score, response, and rank ordering event may be stored. A computing system may obtain the time series data set and instantiate a first node corresponding to the feature and a plurality of second nodes corresponding to respective ones of the responses within an acyclic graph. Nodes in the graph may be linked to other nodes, for example, the first node may be linked to each of the plurality of second nodes by first edges within the acyclic graph, and at least some second nodes may be linked to other second nodes by second edges within the acyclic graph based on a shared classification or determined distance between the natural language text of the respective responses. A computing system may determine, for each first edge, an edge value based one or more rankings associated with the corresponding second node and update a feature score of the first node for the feature based on the acyclic graph, wherein the feature score is based on a weighting of scores associated with respective ones of the second nodes by their respective first edge values.

Some aspects of example processes may include obtaining a probabilistic graphical network model based on a time series data set of feedback received from respective entities of a plurality of entities for one or more features corresponding to an evaluation, such as by a computing system. A computing system may obtain observed data corresponding to a feature represented in the probabilistic graphical network model and train a machine learning model based on a benchmark training data set corresponding to the feature. A computing system may determine, by the machine learning model, an observed score based on the observed data corresponding to the feature and determine a distribution of posterior predictions based on the probabilistic graphical network model. The distribution may be based on a posterior prediction determined for each entity based on respective feedback including one or more scores encoded by the probabilistic graphical network model. A computing system may determine, on a normalized scale, a distance between a peak of the distribution and the observed score, the distance being indicative of a bias of the entities for the feature.

Some aspects of example processes may include obtaining, with a computer system, a probabilistic graphical model based on a time series data set of feedback received from respective entities, among a plurality of entities, for a plurality of features corresponding to an evaluation. The computing system may determine, for each entity, a score indicative of feedback received from the entity for each feature to obtain a set of scores for respective features of the plurality of features, each score being based on the probabilistic graphical model. A computing system may determine, for each feature, a respective distribution based on the set of scores obtained for the respective feature to form a set of distributions. A plot of the set of distributions may be generated by a computing system for display.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
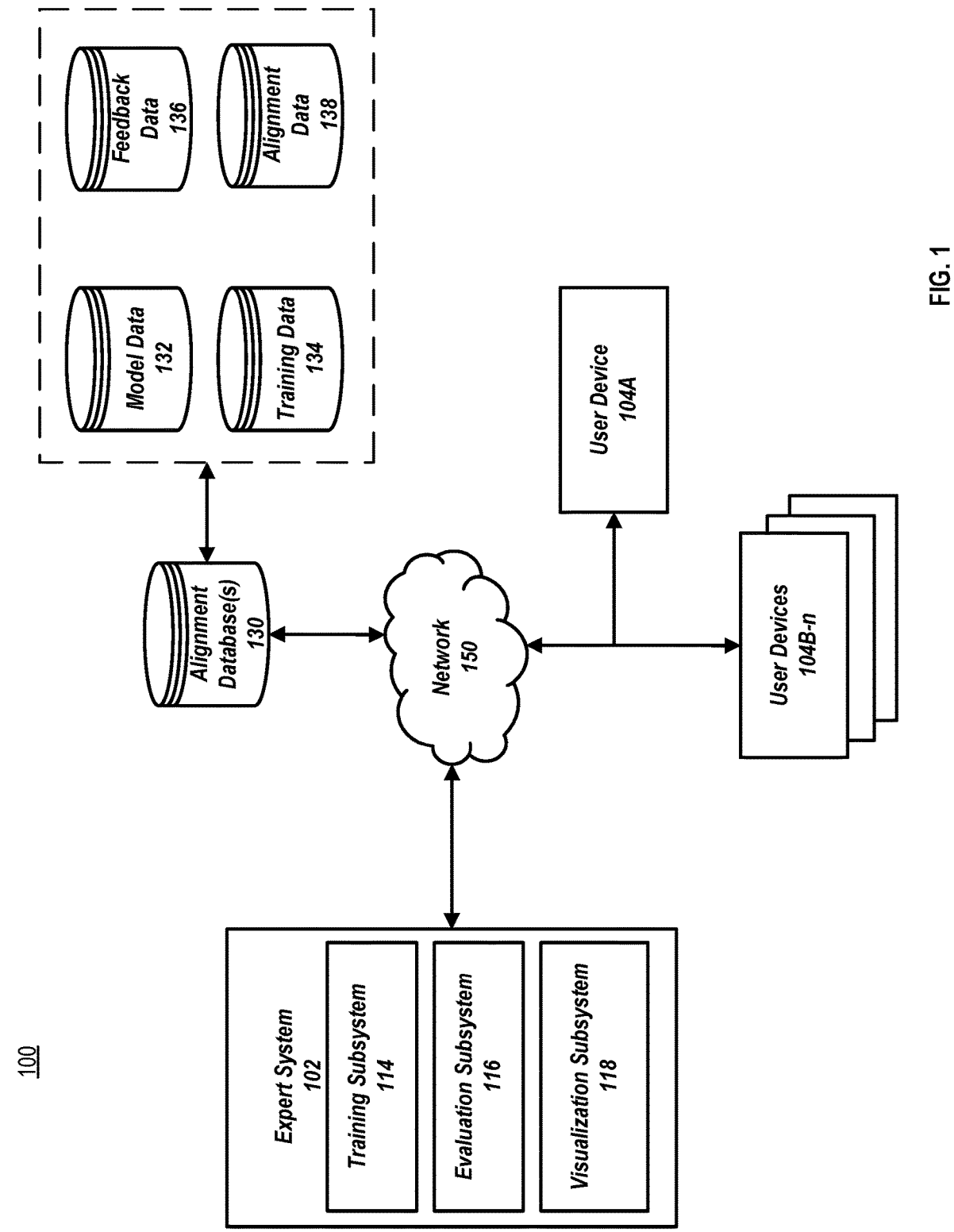
FIG. 1 is an example computing environment for implementing an expert system in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of artificial intelligence. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

One subdomain in which artificial intelligence techniques are applied is called knowledge discovery. Artificial intelligence techniques may be tasked with the extraction (or categorization) of knowledge (or other identification and classification of data of interest) from various sources. Traditional techniques in this (and other) subdomains that are used to extract knowledge (or identify data of interest) from various sources have traditionally relied on inputs obtained from structured data sets stored in a database, or other corpuses, to output meaningful results. Developing and curating such structured data sets is not only burdensome but limits the deployment of such artificial intelligence techniques to applications where those structured data sets exist. In many potential applications for knowledge discovery, whether existing or new or unforeseen, a preliminary task of structuring data within a structured data set for processing is often impractical. As a result, various artificial intelligence techniques have been employed to process unstructured input data, but these attempts are characterized propensity to either produce erroneous results or suffer from too narrow of a focus to permit broader applicability, such as for reasons explained below.

Unstructured inputs, like natural language texts, in contrast to structured data sets, have been more difficult to process. One reason is the challenge of making appropriate tradeoffs between exploration of a source of such knowledge (e.g., interrogating corpora or humans, like experts) and optimizing a model based on what has been observed in such exploration. This tradeoff becomes particularly important when exploration and optimization operations are expensive, for instance, computationally, in terms of latency constraints, or in terms of time and effort of a human being interrogated. Existing approaches are often not well suited for a process constrained by a relatively tight interrogation budget, i.e., where practical constraints limit the number of questions or other stimuli that may be applied to learn about a system. Particularly with unstructured, high-convexity data, existing approaches often fail to consistently ask the right next question given the previous answers.

Some embodiments disclosed herein mitigate these and other issues with a computational technique that determines dynamically, while learning, based on responses to previous prompts, when to transition from seeking new ideas (e.g., exploring) to prioritizing (or otherwise optimizing a model based on) the results observed so far. Optimizing machine learning techniques to navigate the combination of evidence-based reasoning in a dynamic noisy environment of unstructured data sets has potentially profound implications on reducing noise in collaborative contexts (e.g., between different systems, or humans, in which case results may be output as scores or visualizations indicative of exploration and prioritization) by striking a balance between productive action from alignment and excess free energy or noise from unresolved differences of judgment. The techniques are expected to have wide applicability, and it is expected that a variety of forms of artificial intelligence may be improved through use of techniques that efficiently balance exploration and prioritization. Examples include use cases that adjust tradeoffs between expert systems and machine learning, among others discussed below.

Some types of expert systems afford certain advantages over other types of machine learning. Many types of machine learning are not interpretable, meaning that it may be difficult or impossible to determine why a model reached a particular result or articulate guarantees that bound the behavior of the model. As a result, such models often are not suitable for particularly high-stakes use cases in which unpredictable behavior is unacceptable. Further, many types of machine learning are particularly data inefficient, often requiring relatively large training sets to train the model. As a result, such models are often not suitable for use cases in which training data is scarce or particularly expensive to acquire.

Expert systems, in some implementations, may mitigate some or all of these issues. In some cases, expert systems are configured to emulate the behavior of an expert, such as a human expert (the term "expert" herein refers to the entity the expert system is trained to emulate and does not require any objective or subjective level of expertise to qualify as such). Some forms of expert systems are interpretable, in some cases informing users both of an output or results at run-time given an input and a reason for the output or results given the input. In some cases, the reason may have meaningful explanatory power, beyond simply that a given perceptron (e.g., of a neural network) fired and caused some other perceptron to fire, as would be produced in many types of neural networks lacking interpretability, for example. Further, some types of expert systems are particularly data efficient with respect to training. Some types of expert systems engage the expert to explicitly hand-code rules, producing particularly data-efficient results, while others ingest data indicating how an expert responded to stimuli in an environment and learn how to behave like the expert when faced with novel stimuli.

Many types of existing expert systems, however, present challenges. Often, it is particularly expensive to acquire data from experts, whose time is generally quite valuable, and experts that may hand-code rules often struggle to articulate those rules with precision. As a result, expert systems have traditionally been disfavored with certain parts of the artificial intelligence community that regard expert systems as "brittle" approaches that, in practical implementations, fail in the face of unexpected corner cases. Moreover, many types of expert systems only accommodate training data from a single expert, which may make those systems particularly brittle and inaccurate, for example, in use cases in which expertise is diffuse, produces varied results in a population of experts where there is limited consensus, or is held by a diverse set of experts with different areas of expertise.

Existing approaches to aggregate expertise from groups are not well suited for artificial intelligence applications. For example, the field of group decision-making often looks to various voting schemes to aggregate knowledge or preferences of groups, but many of these approaches failed to produce models with sufficient degrees of freedom to engage with anything beyond a trivial complex environment, e.g., asking a group of people to vote between two presidential candidates in a single election aggregates preferences but fails to produce a model that may generalize to other domains. Other approaches like the Delphi method often rely extensively on unstructured data from experts and interpretation of that data by human agents to advance a decision-making process. As such, many of these approaches are not suitable for more automated approaches that may leverage techniques apt to increase efficiency within data domains in which computers excel relative to humans.

None of the preceding discussion of trade-offs should be taken to suggest that any technique is disclaimed, as the approaches described below may be implemented in combination with the various techniques described above.

To mitigate some or all of the above issues, some embodiments train a predictive Bayesian model (like a Bayesian belief network or other graphical model, like a probabilistic graphical model) on responses (e.g., feedback) of experts to stimuli. In some embodiments, the stimuli are selected during a training phase by balancing between exploration and optimization in the selection strategy. Some embodiments balance between divergence and convergent components of a sampling function that determines which stimuli to next present questions to ask experts next. In some embodiments, that balance is adjusted during (for example, throughout) training, e.g., monotonically (or on average), away from divergence/exploration and towards convergence/optimization as training progresses. In some embodiments, the sampling function emulates what a good meeting facilitator does: keep getting new ideas from experts, while balancing that against the need to finish the meeting.

Translating this intuition into code, however, is non-trivial. Moravec's paradox holds that there are certain tasks that are both relatively easy for even a human child to perform (like detecting a dog in a photograph) and are enormously complex and challenging for a computer to perform. This is an example of such a scenario. There is no simple mental process used by a meeting facilitator that may be translated directly into computer code to balance between exploration and convergence. The dimensionality of inputs, and enormous number of ways a meeting of experts could evolve, prevent the articulation of simple rules that mimic what goes on in the mind of a meeting facilitator. As such, the following should not be characterized as simply implementing a mental process with a computer, as a different algorithm from mental approaches, and one more tractable for computer operations, is used in some embodiments.

FIG. 1 illustrates an example computing environment 100 for implementing an expert system in accordance with some embodiments. The computing environment 100 may include one or more user devices 104, servers 102, and databases 130. While only one server, e.g., expert system 102, and database, e.g., alignment database 130, are shown, the expert system 102 or database may include multiple compute or storage servers or be implemented by a distributed system including multiple compute or storage nodes, and functionality or data stored may be distributed across multiple ones of nodes or servers. Each of the expert system 102, database 130, and user devices 104 (or other components described herein) may communicate with one another (which is not to suggest that a component need to communicate with every other component) via a network 150, such as the internet, which may include public or private local area networks. Each of these computing devices may have the features of the computing system described below, including a processor and memory. In some embodiments, the functionality described herein may be implemented with program code or other instructions stored on a tangible, non-transitory, machine-readable medium, such that when that program code is executed by one or more processors, the described functionality is effectuated.

The expert system 102, in some embodiments, may be trained and then run to respond to novel inputs during runtime on various types of physical architectures. Examples include client-server architectures, decentralized architectures (for instance in blockchain governance), or as monolithic applications running on a single computing device. In some embodiments, experts (like a group of 2, 5, 20, 500, 5000, or more people) may each have access to a computing device (e.g., a user device 104a-n) with which the respective expert is presented (e.g., visually on a display screen or audibly with a speaker) with stimuli, and with which the respective experts respond to those stimuli. In some embodiments, a training process may be run on those computing devices or a centralized computing device, like a server system that is remote from the experts, for instance in a data center.

In some embodiments, the expert system 102 may determine measures of alignment associated with the stimuli based on responses provided in relation to the stimuli. For example, after a stimulus and its associated evaluation questions are presented to a set of users, a given user may be provided responses to the evaluation questions supplied by other users and rank those responses of other users who answered the evaluation questions associated with the stimulus. As time goes on, more responses are recorded, and the sampling function must choose the set of questions presented to a user to rank from a larger set of possible responses. To determine relevance scores associated with the ranking of multiple users, the server may apply an A/B testing algorithm to determine a hierarchy of the ranked responses (e.g., which responses receive the highest rankings across multiple rankings done by multiple users). A sampling function may be used to select subsets of responses for ranking in order to scale the A/B testing, as the A/B testing cannot scale on its own as the number of responses increase with time. Thus, A/B testing may be used on the subset of ranked evaluation question responses chosen for a user from the sampling function, and for other users for other subsets, and the rankings may be combined in a matrix by which the body of different response may be ranked. For example, after the users submit one or more rankings of responses, a determination of the total ranking from all users may be performed, relevance scores calculated, and one or more measures of alignment among users around responses for a stimulus and among the plurality of stimuli presented may be determined.

Embodiments of the expert system 102 may include a training subsystem 114, an evaluation subsystem 116, and a visualization subsystem 118 by which functionality of the expert system 102, like that described above, may be implemented. Functionality of these components or otherwise ascribed to the expert system 102 may be divided in different ways, in some cases among different servers. For example, one or more of these components may be hosted on a server providing expert system 102 functionality, or a server system implemented with a plurality of servers that each, or collectively, execute processes upon data or portions of data like that described herein. In some examples, the alignment database 130 may be implemented within the context of the expert system 102, such as by one or more servers or storage servers by which functionalities of components of the expert system 102 are implemented, or separately, such as within a cloud storage system, which the expert system 102 may communicate with to store data and obtained stored data.

The training subsystem 114 may train one or more models, which may include a Bayesian model, deep learning model, or other machine learning models (e.g., any model described in connection with FIGS. 1-3 or elsewhere herein). Examples of such models may include an alignment model, a sampling model, and an encoder model. The different models may be trained in different ways (separately or concurrently through end-to-end training), and some models may receive inputs based on the outputs of other models. Training of a model may comprise end-to-end training, or training of different stages (e.g., like sub-models) of a model (e.g., like a pipeline). Some examples may combine these approaches, such as by training a model and then including that model within a model or as a stage of a pipeline trained end-to-end. The training may be performed using data obtained by the server system 102 from the alignment database 130 or user devices 104, such as over the network 150. The training subsystem 114 may store, access, or update one or more models in various states of training from within the alignment database 130. For example, the training subsystem 114 may access a previously trained machine learning model (or a model undergoing training) and update the model based on newly received (or classified data) and store an updated version of the model within the alignment database 130. The training subsystem 114 may access a trained model to process data which in turn may be used to train another model. Thus, the training subsystem 114 may store or access data within the alignment database 130, such as one or more models 132 and training data 134, and the training subsystem 114 may process such data to train models by which feedback data 136 may be processed to generate alignment data 138. Feedback data 136 and alignment data 138 may be used to further augment training data 134 for one or more models.

Some embodiments of the training subsystem 114 may train a natural language processing model, which may be neural network, or a deep learning model, such as deep neural network, on natural language texts. The training subsystem 114 may train a NLP model based on training data 134 and store a trained NLP model within the models 132 database. The trained NLP model may be accessed by the expert system 102 and loaded into memory to process natural language text, such as natural language text obtained in feedback data 136. In some examples, new feedback data 136 indicative of a measure of quality of a result of processing previously received feedback data 136 may be received and, based on that new feedback and the quality measure, the natural language text and result may be stored as training data for updating the model. The natural language processing (NLP) model may receive as input, a natural language text, or portions thereof, and output scores indicative of properties of the natural language text. Some examples of scores may indicate a relatedness of the natural language text to one or more themes, like a topic, or descriptor of a topic, which may be identified within a training data set including training records indicating natural language text (or texts) and corresponding theme(s), like a portion of text and a theme classification. In some examples, the NLP model may infer potential themes, such as based on groupings of natural language texts, like a cluster of natural language texts, based on distances between the natural language texts, and infer a potential theme based on a frequency of a word or phrase (or synonyms or synonymous phrases) represented within the cluster. In some examples, n-grams, Long Short Term Memory networks, or other techniques may be utilized in connection with, or instead of, the above techniques to determine theme classifications. One or more potential themes may be assigned to the cluster, and thus the texts within the cluster, whether manually or based on a threshold (e.g., like a ratio of frequency to number of samples within the cluster being below a threshold) or based on a set of sample themes and distance between one or more potential themes and a sample theme (e.g., a sample theme may be assigned automatically when the distance of one or more potential themes and the sample theme is below a threshold).

Some embodiments of the training subsystem 114 may train an alignment model, which may be a predictive Bayesian model (like a Bayesian belief network or other graphical model, like a probabilistic graphical model) on responses (e.g., feedback) to stimuli. Some embodiments may use an iterative training process to train the alignment model in association with an evaluation, which may include the collection of a plurality of responses to stimuli over several evaluation sessions during the course of the evaluation (and corresponding training of the model). The training subsystem 114 may train the alignment model on data obtained during an evaluation by the evaluation subsystem 116, which may include outputting results after training to the evaluation subsystem 116, and data based on the results may be used in a subsequent evaluation to obtain additional data for processing by the training subsystemb. Embodiments may iterate the training and evaluation processes, e.g., a number of times, like 5, 7, or 15 (or more, though embodiments are apt to reducing the number of iterations to reduce participant fatigue in the context of human evaluator and in example use cases these improvements may reduce training time due to minimizing the number of iterations), to train an alignment model corresponding to the evaluation.

For example, during training, some embodiments may obtain a set of stimuli to train an alignment model on responses to the set of stimuli. In some examples, a group of experts, or users, such as via respective user device 104A-n, may be presented with the set of stimuli over the course of an evaluation. A user may be presented with one or more of the stimuli during a given evaluation session, and the evaluation may include multiple sessions. In some examples, such as based on feedback data 136 provided by other users in relation to a stimulus, the user may be presented with a set of items in relation to the stimulus. The user may provide (e.g., as additional feedback data) a ranking of the items within the set, e.g., as a ranked-choice measure of quality of the items. In some embodiments, the alignment model may be operative to learn causal relationships rather than just correlations. In some cases, the group of people may be experts in a particular field or a diverse set of fields. In some cases, the experts are (or include) nonhuman agents, for instance, non-interpretable machine learning models from which an interpretable expert system is being trained to afford various guarantees about performance that those noninterpretable machine learning models cannot provide, thereby transforming those noninterpretable machine learning models into interpretable expert systems by learning to approximate their behavior.

In some embodiments, the set of stimuli may include a set of propositions, or other content to solicit a response, and some or all of the stimuli may solicit qualitative or quantitative feedback. In some examples, the feedback may be explicit or implicit. For example, user dwell time while providing a given feedback type may be tracked, or dwell time may be tracked as a measure of feedback. For example, a user may be presented with a series of images and user dwell time on a given image may be recorded (and scored) as a measure of implicit feedback, separately a user provided score (e.g., positive/negative or score or ranking on a scale) may be recorded as quantitative feedback (e.g., explicit), and the user may be prompted for qualitative feedback. For example, a user may be prompted with a question, like "is this item better than that item," or "is this proposition true or false," or "is there something that could be improved" or the like. In some cases, the set of stimuli are defined by previously-composed, human-readable content, for example, natural language text, audio of spoken natural language text, images, video, or the like, or the set of stimuli may be procedurally defined, for instance, with a function that generates stimuli. In some cases, the set of stimuli may include more than 5, more than 10, more than 20, more than 50, more than 500, more than 5000, more than 50,000, or more than 5 million different or distinct stimulus. In some cases, stimuli may be supplied by experts in a previous iteration of the training routine. In some cases, these expert-supplied stimuli may undergo processing, for example, to group semantically similar stimuli with latent semantic analysis or group them into topics with latent Dirichlet allocation or embedded topic modeling, or in some cases a combination of the above or similar techniques. In some cases, stimuli may be grouped with various forms of metric learning and clustering (e.g., DB-SCAN, k-means, or the like). Selected representative members of groups (e.g., closest to a centroid of the cluster) may be added to the set of stimuli.

Some embodiments may obtain, during training, a set of feedback events, where each feedback event corresponds to a respective stimulus among the stimuli and a respective member of the group. In some cases, the feedback event may be a response of the member of the group of experts to the stimuli. This may include presenting the respective stimuli to the respective member of the group and receiving a feedback, such as quantitative or qualitative feedback, from the member in relation to the respective stimuli. For example, the member may provide a score and a respective natural language text response (or response in other form, like audio, or selection of a radio button or check box or adjustment of a slider UI) of the respective member of the group to the respective stimulus. Some embodiments may include sampling a subset of the natural language (or other form of) responses of other members of the group to the respective stimulus. Some embodiments may present the sampling to the respective member of the group to solicit feedback from the member on feedback provided in response to the stimulus by other users. Some embodiments may receive a ranking of the respective member of the group of the sampling based on agreement by the respective member of the group with the sampled subset of the responses above or other members of the group to the respective stimulus. In some cases, experts may indicate a ranked order of sampled responses from other members of the group indicating how much the respective member of the group agrees with the responses of others. In some cases, the subset may include 2, 5, 15, 50, or more responses. In some cases, a stimulus may be quantitative or qualitative questions. In some embodiments, responses may include both an answer to the question and a reason for the answer, either or both of which may be structured values or natural language responses.

Some embodiments of the training subsystem 114 may train a sampling model, which may be trained to strike a balanced between exploration and optimization. For example, the sampling model may determine a mapping of an input text within a semantic space, and select, based on mappings of input texts within the semantic space, a subset of texts. The selection may be performed based on distances between different texts within the semantic space and rankings (e.g., user feedback rankings) of different texts relative to other texts. Thus, in some examples, the sampling model may receive outputs of other models, like a NLP model, and other data associated those outputs. For example, a text may be processed by the NLP model to determine its mapping within the semantic space, like a vector representation of the text, which may also include one or more labels, like a theme, in some examples, and that text may be associated with a ranking relative to one or more other texts (e.g., which may have same or different labels, but which are presented to a user for ranking in association with a same stimulus). Training data may comprise prior iterations of evaluations in which a semantic space is explored over time, such as over the course of a number of evaluation events, like 5, 7, or 15 (or more, though embodiments are apt to reducing the number of iterations to reduce participant fatigue in the context of human evaluator and in example use cases these improvements may reduce training time due to minimizing the number of iterations), corresponding to an evaluation. The training based on prior evaluations may maximize an objective function corresponding to the selection of texts (e.g., like those newly added and not yet ranked) that covers a threshold amount of the semantic space (e.g., for stimulus or topics) while minimizing time to a threshold degree of alignment, like convergence, of rankings of texts for a stimulus or label.

For example, in some embodiments, the sampling model may process inputs to select a set of texts obtained from previous events that have a divergent component and a convergent component. In some embodiments, the divergent component may bias sampling towards exploration of the space of stimuli while the convergent component may bias sampling towards optimization of the model being trained in explored areas. In some embodiments, the relative contribution of these two components to sampling may be adjusted dynamically during training, for example, monotonically away from exploration and towards optimization (e.g., over time), or responsive to feedback (e.g., based on input texts and associated rankings). In some embodiments, the adjustment may be made based upon various approaches to the multi-armed bandit problem. Examples include an adaptive epsilon-greedy strategy based on value differences (VDBE), an adaptive epsilon-greedy strategy based on Bayesian ensembles (epsilon—BMC), and a contextual-epsilon-greedy strategy. Some embodiments may apply various approximate solutions for the contextual bandit problem, like the UCBogram algorithm, the NeuralBandit algorithm, the KernelUCB algorithm, or the Bandit Forest algorithm.

Some embodiments of the training subsystem 114 may train an encoder model (e.g., a neural network, which in some examples may be an attentive neural network, like a deep learning neural network or recurrent neural network, including or integrating an attention model) to reduce high-dimensional data, like a vector having 10,000, 100,000 or 1,000,000 or more dimensions, into a latent space embedding vector having significantly fewer dimensions, like 500 or fewer dimensions. Some embodiments may include repeating the above-described stimulus presentation, questioning and answering process, and response ranking, or otherwise presenting stimuli and receiving events responsive to the stimuli, during a training session of one or more models. In some embodiments, while attending the set of events through a training session, some embodiments may determine for each response to stimulus of obtained events, a respective vector in an embedding space determined with distance metric learning, for instance, with the encoder model that maps relatively high dimensional inputs (like natural language text) into a lower dimensional (e.g., 5 to 500 dimensions) continuous vector space representation. For example, in some embodiments, the latent space embedding vector may include positioning information reduced to a 3-D space mapping (e.g., like a set of coordinates, which is not to suggest that other dimensions cannot include other data, like a corresponding score (or scores) or rank (or ranks, e.g., for a stimulus or topic, or across all stimuli), content represented by the vector, etc.).

In some embodiments, the training subsystem 114 trains the encoder model on high dimensionally data, like the above-described vectors corresponding to natural language texts, and themes corresponding to those texts. The training of the encoder model may include a policy which enforces a maintaining of relative distances of the high dimensionality data within the latent embedding space, or a subspace of the latent embedding space. For example, different themes (e.g., by which high-dimensionality data input vectors may be classified by a NLP model) may correspond to different subspaces within the latent embedding space by which a 3-D visualization may be initialized to display locations of output latent space embedding vectors that maintain relative distance within (e.g., at least) the subspace. In some examples, relative distance between subspaces may be preserved, which in some examples may be normalized to attenuate distances relative distances of embeddings within the subspaces (e.g., for visualization).

Some embodiments may determine pairwise distances in the embedding space between respective pairs of the vectors. Distances may be calculated with a variety of distance metrics including Minkowski distance, Euclidean distance, cosine distance, Manhattan distance, and the like. Some embodiments may determine for each response to stimulus of obtained events, a respective aggregate distance based on a subset of the pairwise distances, including the respective vector of the respective response. Some embodiments may determine relevance scores based on eigenvalues of transition probability matrices based on adjacency matrices of the rankings. In some embodiments, other models may operate on the latent space embedding vectors, and the latent space may correspond to a semantic space covered by the different vectors. For example, a sampling model may take as input a latent space embedding vector for a natural language text to train on reduced dimensionality data within the latent embedding space. Some embodiments may further adjust the sampling and subsequent iterations of training of the alignment model based on relevance scores (e.g., based on rankings) of responses and amounts of times responses have been sampled and aggregate distances of vectors of responses in the embedding space.

In some embodiments, the training subsystem 114 may store one or more resulting trained models in memory to be applied to runtime problems, for instance, on a different set of computing devices, at a later time (e.g., more than a day later). In some embodiments, a trained model may be responsive to inputs and a computing device may apply the trained model to produce outputs, in some cases along with a reasoned explanation of why the inputs produce the outputs. Results may be presented on a user computing device and stored in memory. The present techniques may be applied to various types of models, such as those with non-differentiable optimizations during training. Examples include direct policy learning and behavior cloning in reinforcement learning, and some embodiments may apply the present techniques to learning (e.g., policies or reward functions of) other model-free reinforcement learning models. In some cases, where training involves nondifferentiable optimizations, it may be difficult or impossible to use various forms of training used in other types of machine learning, like gradient descent.

The evaluation subsystem 116 evaluates or presents data obtained from one or more sources, such as from the alignment databases 130, user devices 104, or other subsystems of the expert system 102. An evaluation may be performed on data that is fed to, or obtained from, the training subsystem 114 and feedback collected from users based on the that data. The evaluation subsystem 116 may process obtained data during, or after, an evaluation. The evaluation subsystem 116 may take inputs from a user device 104, such as by transmitting data for evaluation to the user device (e.g., which may be displayed via an evaluation application (not shown) executed by the user device) or generating an interface (e.g., like a web-based interface, like a web-page or via a web-application) including data for evaluation that may be accessed by the user device (e.g., via a web-browser), and obtaining feedback (e.g., from the user or user device) on the data being evaluated.

For example, the evaluation subsystem 116 may obtain feedback (e.g., responses) on data for evaluation (e.g., features or other stimuli) displayed or otherwise communicated to the user via the user device. Examples of feedback may include implicit feedback, such as user dwell time or other metrics indicative of user engagement, or explicit user feedback, such as scores, ratings, rankings, or natural language text responses in relation to a feature or stimuli. For example, a user may evaluate a feature by providing or selecting a score or rating (e.g., quantitative feedback) via a user interface element. The score or rating may be selected via the user interface element, such as a slider, which may indicate a range of possible scores or ratings for positioning the slider, or the user may otherwise select or input a score or rating within a range (such as 1-10, 1-5 stars, positive/neutral/negative, or a binary positive/negative).

In another example, a user may evaluate a feature by providing a response (e.g., qualitative feedback), like a natural language text response (which should be read to include an image, audio or multi-media response that may be processed to obtain natural language text) evaluation of the feature via a user interface element, like a text box. In some examples, a prompt may be displayed in association with a user interface element for a response including qualitative feedback, such as a text box, and the prompt may be determined responsive to the score or rating provided by the user (e.g., for the feature prior to supplanting the score or rating with the response, like a reason for the score or rating assigned by the user to the feature).

In some examples, the evaluation subsystem 116 may provide for display via a user interface a set of responses (e.g., natural language text responses of other users to a stimuli) and prompt the user to rank the items, such as based on the degree to which the user agrees with, or otherwise appreciates the responses in the set. For example, the user interface may provide selectable rankings or drag to reorder or drag and drop or other interactive user interface elements in relation to the different responses and by which the user may interact with to indicate rank among the responses in the set. The ranking of the response may be obtained by the evaluation subsystem 116 and stored as user feedback data 136 within the alignment database 130.

In some embodiments, the visualization subsystem 118 may obtain data processed by other subsystems of the expert system 102 and generate a visualization corresponding to the data. For example, the visualization subsystem 118 may generate a visualization of a semantic space based on latent space encodings, or a visualization indicative of alignment scores, or other data stored within the alignment database 130. The visualization subsystem 118 may redetermine a visualization based on selections of features or data or scores or rankings (e.g., by one or more filters) or distance attenuations (e.g., linear or logarithmic) applied to the latent embedding space based on input received from a user device 104A via the network 150.

Some examples of the environment 100 may include an alignment database 130, like that illustrated, which may store data about trained models or models undergoing training, user feedback, training data, and alignment data. For example, the alignment database 130 may include data about one or more models 132 (e.g., one or more iterations thereof, like architectures, hyperparameters, and model parameters adjusted through training) and stimuli for a model, or other data. In some embodiments, the model data 132 may include parameter values (e.g., values of weights, biases, etc.) of the various models described herein. In some examples, such as in the case of multiple concurrent evaluations which may each corresponding to an iterative training process of a respective model, the model data 132 may include a record (or a number thereof) corresponding to an evaluation, which may contain evaluation specific parameters of the models among other data, such as stimuli, for the evaluation.

Embodiments of the alignment database 130 may include alignment data 138, such as predictions or results indictive of a state of alignment for an evaluation. Thus, the alignment data 138 may include results or determinations based on the processing of feedback data 136 and training data 134 stored within the alignment database 130 by one or more of the models 132 executed by the expert system 102. In some examples, the alignment data 138 may include one or more predictions on the alignment of users participating in an evaluation. The alignment data 138 may also include determinations about the data upon which the predications are based, such as distances between responses and other measures of alignment, by which visualizations of an evaluation may be generated.

Embodiments of the alignment database 130 may include training data 134, like training data records, by which one or more of the models stored within the alignment database may be trained. The training data 134 may include different training record sets for different models. For example, a training record set for an NLP model may include natural language texts and their classifications. In some examples, the feedback data 136, such as after processing, by one or more models, may be used to augment the training data 134.

Embodiments of the alignment database 130 may include feedback data 136. Examples of feedback data may include user feedback data, which may be stored in records that indicate for which data the feedback was provided. For example, a feedback data record may indicate an evaluation, a user, one or more features (e.g., stimulus), and respective feedback data obtained for a feature. For example, feedback data for a stimulus may include a score or rating and natural language text response (and in some cases, information about a prompt that solicited the response), or other user feedback described herein. Another example of feedback data for a stimulus may include a ranking of responses that other users provided for the stimulus. A time stamp corresponding to a feedback event for a stimulus may be stored within the record. Users are expected to provide, with respect to an evaluation, a rating and response (or updating thereof, which may be a new event) in relation to a plurality of respective stimuli upon their presentation to the user (and the user may revisit those stimuli in some examples to update a rating or provide a new response), and the different stimuli may be presented over some period of time (e.g., multiple sessions of the evaluation). Additionally, the user may be presented with a set of responses provided by other users to a stimulus, such as after the user rates and provides their response to the stimulus (or if the user revisits the stimulus), and the user may provide a ranking of the responses within the set of responses. Timestamps associated with these feedback events, which are in many cases based on a current state of collected data or model output, rather than a final state of data or model output, may afford structuring of feedback data as a time-series of feedback events by which an evaluation may be replayed, such as for training or to test improvements of updated models or to otherwise validate results.

Figure 2:
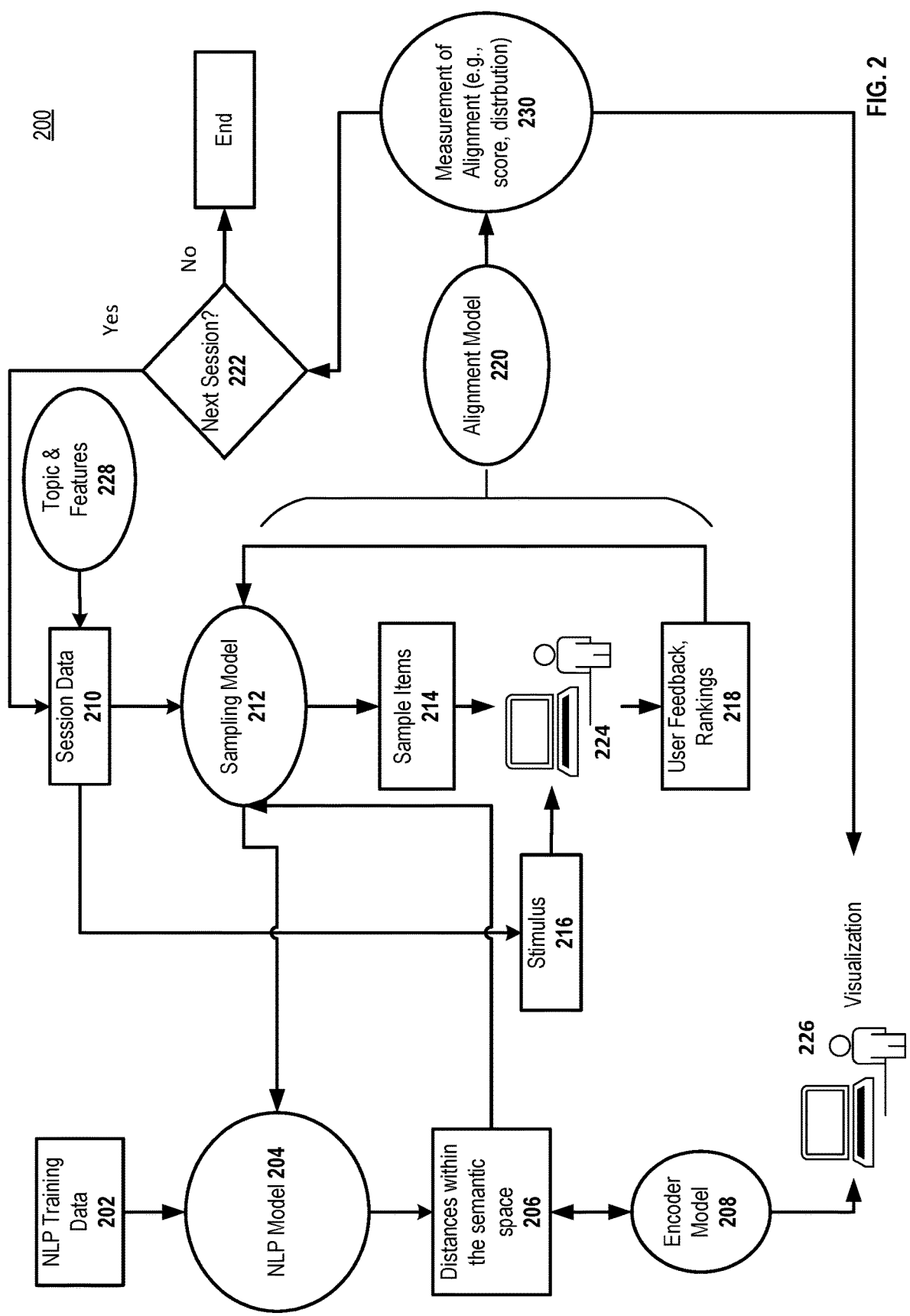
FIG. 2 is an example machine learning and training environment of an expert system upon which the present techniques may be implemented in accordance with some example embodiments.

FIG. 2 is an example machine learning and training environment 200 of an expert system upon which the present techniques may be implemented in accordance with some example embodiments. In some embodiments, a server may obtain a topic and features of the topic 228 corresponding to an evaluation. The server may select one or more features to evaluation session data 210. For example, the server may select one or more features not yet evaluated by a user for which the session is being executed. A feature for evaluation may include a stimulus and one or more evaluation questions that relate to the stimulus. For example, the server may present to a user a set of evaluation questions that relate to investing in a company or product, hiring or promoting an individual or employee, selling a company, or determining benefits for employees.

In some embodiments, a stimulus 216 may be presented to the user 224 via a graphical user interface. The stimulus may relate to a feature (e.g., like an aspect to be considered within the context) of a concept or topic, and the set of evaluation questions may be specific to that aspect or feature for consideration. Each evaluation question may be distinct, but each evaluation question relates to the stimulus. For example, a stimulus may be intellectual property, finances, marketing, investing, management, business models, or competition in relation to a broader topic of evaluation of a company. A stimulus, such as in relation to investing, may be presented in the form of a question, such as "should we invest in company X?" While the stimulus may be a generic question, the evaluation questions may be a set of questions that pertain to the details in answering the generic stimulus questions. For example, to answer the stimulus question "should we invest in company X?" a set of evaluation questions may be "do you think that investing in company X will increase revenue?" "Does company X have business goals that align with ours?" "How much should we invest if choose to go forward with company X?" The stimulus may provide a contextual reference for the evaluation questions to evaluate how users of a population view a feature of the topic as framed by the evaluation questions.

In some examples, a stimulus may be attached with a static set of evaluation question that are consistently presented to users for evaluation of the stimulus. In some embodiments, one or more evaluation questions associated with a stimulus may change as a function of time, or as a function of how the user initially scores or rates the stimulus or responds or does not respond to an evaluation question. In some examples, the set of evaluation questions may be selected for the stimulus based on feedback provided by the user in one or more prior evaluation sessions. For example, different evaluation questions may be selected based on whether the user exhibits generally pessimistic or optimistic scoring behavior. In some examples, the server may randomly select the subset of evaluation questions associated with the stimulus. The random selection of evaluation questions may choose the evaluation questions one at a time or all at once. The random selection of evaluation questions may be performed by randomly selecting predetermined subsets of the total set of all evaluation questions associated with the stimulus. An evaluation question may be unique to a single stimulus, or it may be a member of multiple subsets of evaluation questions associated with multiple stimuli. In some examples, the server may select a stimulus with a variable number of questions, which in some examples may be based on user behavior exhibited in user feedback, like a proclivity to skip or omit providing of one or more feedback components after a threshold number of evaluation questions. In some examples, the server may select stimulus and one or more evaluation questions from 5, 10, 25, or 100 (or other amount of) available questions based on a user indicated preference. The server may individually select evaluation questions to form a set whose elements equal the requested variable amount, or the server may select subsets of evaluation question to form a new subset of evaluation questions whose number of unique elements is equal to the variable number. The evaluation questions associated with the stimulus may be independently of each other, or the evaluation questions presented to a user may depend on the response a user provides to a previous evaluation question.

The session data 210 may further include an indication of the state of user progress through the evaluation (e.g., number of sessions in which the user participated) and a state of progress of the evaluation (e.g., as indicated by a measure of alignment 230) or based on session engagement across all users. In some examples, the session data 210 may include information about the quality of feedback provided by the user (e.g., as ranked by other users), like an influence rank, or alignment of the user with other users. In examples, the above data may be received as input by the sampling model 212 to bias selection of sample items 214 based on additional factors. For example, certain types of users or a user exhibiting certain characteristic, as categorized based on one or more of the above factors, may be deemed more likely (or less likely) to distinguish one sample item from another in a set of sample items to be ranked. Thus, for example, in addition to selection sample items that probe a semantic space, sample item selection may be biased based on other factors.

Prior to an evaluation, in some embodiments, natural language texts (and in some examples classifications thereof), like NLP training data 202 records, may processed to train an NLP model 204 (like a neural network, which may be a deep learning neural network, or another machine learning model, and in some cases may include a clustering model) to infer themes and relate (e.g., by distance measures) natural language texts. The trained NLP model 204 may receive, as input, one or more natural language texts. In some examples, the NLP model 204 may identify a theme corresponding to an input natural language text, such as based on a measure of distance between the input text and the theme. Each theme may correspond to an area (e.g., like a subspace) within a semantic space to which a natural language text may map. The NLP model 204 may receive as input a plurality of natural language texts in association with an evaluation, each of which may map to a given theme. The collection of themes may correspond to the areas of the semantic space covered (e.g., by at least one received input text) during an evaluation. The distances of texts to themes and between themes within a semantic space 206 may be recorded as the evaluation progresses. Thus, for example, the distances within the semantic space 206 may be evaluated to determine which themes are well represented or underrepresented, such as by number of texts mapped to the theme, and which texts mapped to a given theme are similar (e.g., such as based on a distance between those texts).

In some embodiments, The NLP model 204 may process the unstructured responses and create a high-dimensionality vector corresponding to the unstructured responses, for example, via Word2Vec or BERT. The NLP model 204 may, based on the high-dimensionality vector, infer a theme corresponding to the vector (e.g., determine a classification for the input text). After the NLP model creates the vectors corresponding to the unstructured responses, in some embodiments a dimensionality of the vectors may be reduced via an encoder model 208. The encoder model 208 may, for example, take as input a high dimensionality vector and return a vector with reduced dimensionality within a latent embedding space. In some examples, distances within the semantic space 206 may be determined based on reduced dimensionality vectors within the latent embedding space (which, e.g., represents the semantic space with orders of magnitude fewer dimensions). In either case, embodiments may determine distances between vectors representative of natural language texts within a semantic space 206, where the semantic space may be multidimensional (e.g., 2, 5, 10, 100, or more dimensions). In some examples, a mapping, or embedding, of vectors within the semantic space may be reduced to a 3-Dimensional space (which is not to suggest that the vector may not include other dimensions, such as related scores or ranks or other data, only that the vector includes information by which the embedding may be mapped in 3-D space). The embedding information within 3-D space generated by the encoder model 208 for input texts may be processed to generate a visualization of the semantic space and the vectors within it, such as for presentation via a user interface on a user device 226. The embeddings of vectors within the semantic space may be updated during the course of an evaluation and the visualization may depict a point-in-time view of points or regions explored within the semantic space. Other data, like additional dimensions, corresponding to those vectors, like scores or rankings, or which user provided a response represented by the vector, and content of the response, may also be presented, such as by different sizing or colors of corresponding embeddings within a 3-D space based on score or rank, display of response text (e.g., for highly ranked or scored responses, or for clusters thereof, or by selecting a given embedding), among other data.

As outlined above, session data 210, such as for an evaluation, may include an indication of a topic, like a product or decision being evaluated, and associated topic or product data, e.g., one or more features, as stimuli for evaluation by a user during a given evaluation session. The session data 210 may include data received from a previous session of the evaluation, such as from other users, or based on data received from a user during a prior evaluation session. The session data 210 may include one or more stimuli (e.g., features), and evaluation questions, that are provided to the user during a given evaluation session. Over the course of an evaluation, a user may participate in a number of evaluation sessions where, in each evaluation session, the user may respond to or other evaluate at least some new session data 210, such as by providing feedback, like in a feedback event. The session data 210 may be provided to the sampling model 212, and the sampling model 212 may obtain data about previous sessions of the user and other users, such as user feedback data, like rankings, and information about the content that was ranked, like their distances within the semantic spaces and other classifications of that data.

In some embodiments, the sampling model 212 may evaluate responses to an evaluation question, such as based on their distances within a semantic spaces and associated rankings as indicated by users to select sample items 214 as a subset of the responses provided to the sampling model 212. Thus, the sample items 214 may be unstructured responses of other users that were previously submitted in relation to an evaluation question. The sample items 214 and a stimulus 216 may be presented to a user via a user device 224. A user may provide feedback to the stimulus 216, where the feedback 218 may be a score or rating, like on a scale, or a binary response (e.g., "yes" or "no," 1 or 0, True or False), or an unstructured response to the feature of an evaluation question prompting feedback for the feature. Then, a user may provide feedback to the sample items 214, where the feedback 218 may be a ranking among the unstructured responses in the sample set for an evaluation question.

In some embodiments, a server may present to a user 224 participating in an evaluation session, via a graphical user interface, an evaluation question that is associated with the stimulus 216 based on the session data 210 for the user. Obtained feedback 218 may include a score or unstructured data. A score may correspond to explicit user feedback, such as a rating provided by the user. The score may be binary (e.g., good/bad) or <other, e.g., scale of 1-10, A-F, etc.>. In some cases, the score may correspond to explicit user feedback, such as whether a user performed a particular action, such as a purchase of a product or proceed with a first selected option, or a numerical value associated with how well the user agrees with a proposed reasoning (e.g., 1 for completely disagree, 3 for no opinion, or 5 for completely agree). Unstructured data may include a response entered via a graphical user interface. In some cases, implicit user feedback, like dwell time on an option or area of a page may be obtained as user feedback 218 and scored. Thus, examples of obtained user feedback data may include both scores and unstructured data. Example user interfaces may prompt input of a score and provide for input of (e.g., via a dialogue box) unstructured natural language text. Thus, for example, a user may input into the dialogue box a reason or response as to why the user assigned their given score to the feature in prose (though there is no requirement that user input inherently be related).

In some embodiments, the server may use an API to obtain the user feedback on sample items 214 or stimulus 216 or collect user feedback 218. For example, the server may obtain, in real-time, natural language text (which may be based on audio or textual input) responses communicated in relation to discussion of the feature in a meeting, such as over a video-conference via a web-based interface or video conference application. The server may process the obtained natural language text and output, such as to a user interface element, like an evaluation pane, an indication of the feature and responses of other users (e.g., a sampling of responses generated for the user) to be ranked. Upon receipt of a submission of a ranking of responses from the user, a subsequent set of a responses may be returned to the user, such as after a threshold number of other users respectively rank their sampling of responses. The sampling and ranking may be repeated, like in the case of other example evaluations discussed herein, and processes to train a model by which alignment of meeting participants may be analyzed and the semantic space covered by the meeting evaluated in accordance with the techniques disclosed herein.

Obtained user feedback 218 may be provided back to the sampling model 212 with an indication of the stimulus or sample items for which it was provided. If the user feedback 218 is an unstructured response, the sampling model 212 may provide the unstructured response to the NLP Model 204. The NLP Model 204 may then convert the unstructured response to a vector, for example, via Word2Vec or BERT. The NLP Model 204, or the encoder model 208, may determine the semantic distances between the vector 206 corresponding to the unstructured response and the other vectors within a semantic space. The converted vector and distances may be provided to the sampling model 212, which may update, for example, a priority for selecting the natural language text response to a set of sample items for another user (e.g., based on the distances, such as whether the response corresponds to an explored or unexplored area of the semantic space, among other objectives).

In some embodiments the sampling model 212 may determine the sample items 214 to be presented to the user 224. The sampling items 214 may be unstructured responses whose corresponding vectors in the semantic space satisfy a threshold distance with respect to one another within the semantic space. For example, choosing vectors that are far apart from one another in the semantic space may present to the user 224 unstructured responses that are different from one another within a context or theme, as determined by the NLP Model 206, and user ranking thereof may indicate (e.g., with greater distinction) which responses the user aligns with most closely within the context. In some cases, choosing vectors that are near to one another in the semantic space may present to the user 224 unstructured response that are similar to one another within a context or theme, and user ranking thereof may indicate (e.g., with greater distinction) which responses the user believes best represent that area of the semantic space.

In some embodiments, a user 224 may provide user feedback 218 in the form of an unstructured response. The unstructured response may be provided to the NLP model 204 via the sampling model 212 and determine a first vector in the semantic space corresponding the unstructured response and determine its distance to other vectors within the semantic space 206. When the sampling model 212 receives the first vector and its distance with respect to other vectors in the semantic space, the sampling model 212 may choose not to include the unstructured response as a possible sample item 214 if the unstructured response is determined to be similar to a previous unstructured response that has been ranked low. The sampling model 212 may determine that the semantic distance between the first vector and a second a vector corresponding to a low-ranked unstructured response are close enough that the first vector is predicted to receive a low ranking.

The user feedback 218, such as rankings of vectors within the semantic space, and the vectors and distances, may be provided to an alignment model 220. The alignment model may determine one or more measurements of alignment 230 across the rankings 218 of the user, and other users, with respect to the responses represented by the vectors and based on the distances between the vectors.

The alignment model 220 may outputs one or more measurements indicative of alignment 230 of users with respect to the responses obtained (e.g., so far) over the course of an evaluation. Example measurements indicative of alignment may include a distribution of rankings that indicates how well all users who provide feedback are aligned with one another with regards to a stimulus or the topic provided to the sampling model from the session data. The system may initialize a new session for next or updated session data and the sampling model 212 may continuously provide sample items 214 to the user 224 (and other users with sample items) in respective next evaluation sessions 222 until the results output by the alignment model 220 indicate at least a threshold minimization state for the evaluation. A minimization may occur when one or more of the measurements of alignment 230 exhibit less than a threshold amount of change with the inclusion of new user feedback or rankings 218, which may correspond to a stop condition for initializing next sessions 222 for users. In some examples, each user may evaluate each stimulus, but in some cases, users (or a subset of users) may only evaluate a subset of available stimuli. Until a minimization of the measure of alignment 230 occurs, the system may continue to a next session 222 of provisioning session data 210 for evaluation. In some embodiments, a current measurement of alignment 230 may be provided to a user 226 (which may be the same or a different user than user 224) after each user ranking event or at the end of an evaluation session. In another embodiment, a user 226 may be provided with the measurement of alignment 230 after the alignment model 230 has reached a minimization of the measurement of alignment 230. The alignment model 220 may determine a measurement of alignment 230 for all user feedback or rankings or for a subset of the user feedback or rankings. The user device 226 may be provided with a measurement of alignment 230 for all user rankings, the measurement of alignment 230 for a subset of user rankings, or both.

Figure 3A:
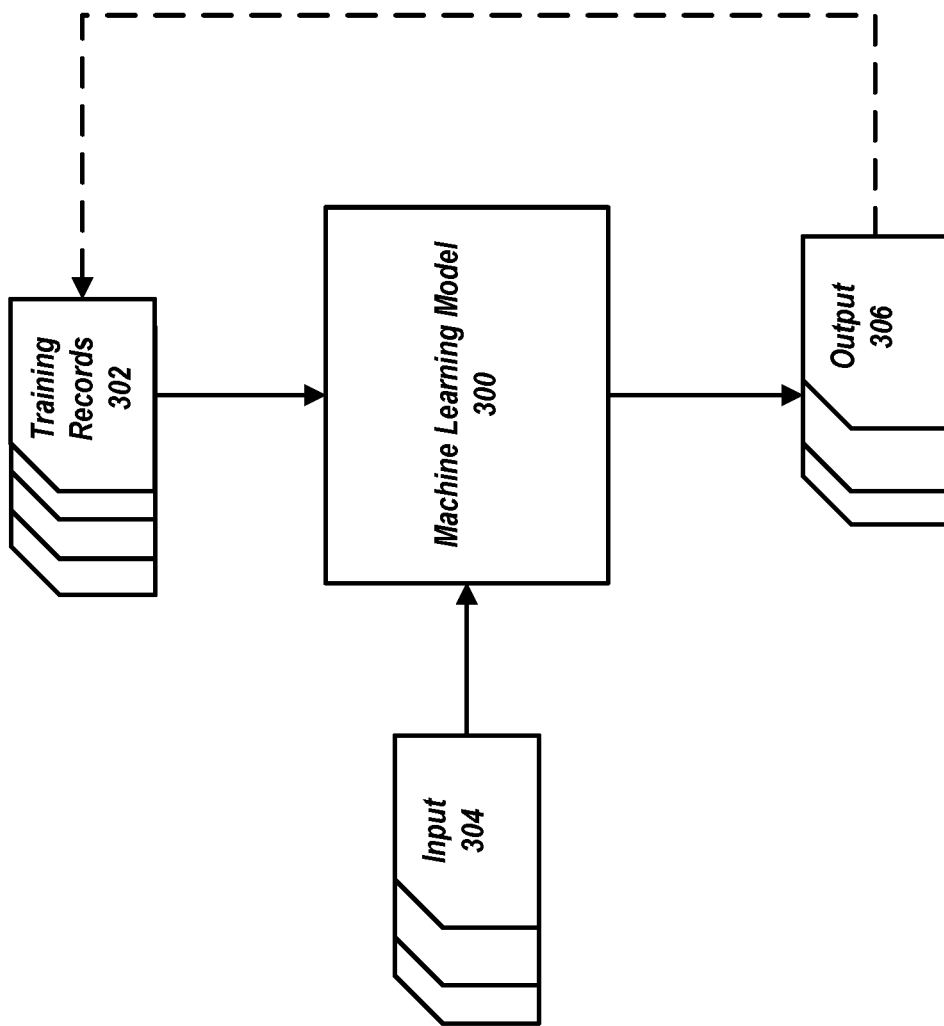
FIG. 3A is an example machine learning model in accordance with some embodiments.

As an example, described with respect to FIG. 3A, a machine learning model 302 may take one or more inputs and generate one or more outputs. Examples of a machine learning model 302 may include a neural network or other machine learning model described herein, may take inputs 304 (e.g., input data that described above) and provide outputs 306 (e.g., output data like that described above) based on the inputs and parameter values of the model. For example, the model 302 may be fed an input or set of inputs 304 for processing based on a user feedback data or outputs determined by other models and provide an output or set of outputs 306. In some cases, outputs 306 may be fed back to machine learning model 302 as input to train machine learning model 302 (e.g., alone or in conjunction with indications of the performance of outputs 306, thresholds associated with the inputs, or with other feedback information). In another use case, machine learning model 302 may update its configurations (e.g., weights, biases, or other parameters) based on its assessment of a prediction or instructions (e.g., outputs 306) against feedback information (e.g., scores, rankings, text responses or with other feedback information) or outputs of other models (e.g., scores, ranks, distances, themes, etc.). In another use case, such as where machine learning model 302 is a neural network, connection weights may be adjusted to reconcile differences between the neural network's prediction or instructions and the feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions or instructions.

In some embodiments, the machine learning model 302 may include an artificial neural network. In such embodiments, machine learning model 302 may include an input layer and one or more hidden layers. Each neural unit of the machine learning model may be connected with one or more other neural units of the machine learning model 302. Such connections can be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine learning model 302 may be self-learning or trained, rather than explicitly programmed, and may perform significantly better in certain areas of problem solving, as compared to computer programs that do not use machine learning. During training, an output layer of the machine learning model 302 may correspond to a classification, and an input known to correspond to that classification may be input into an input layer of machine learning model during training. During testing, an input without a known classification may be input into the input layer, and a determined classification may be output. In some examples, a classification may be an indication of whether a selection of samples is predicted to optimize an objective function that balances between exploration of a semantic spaces and optimization of convergence in explored areas. In some examples, a classification may be an indication of a theme detected in a natural language text, such as based on a vector indicative of the natural language text. In some examples, a classification may be an indication of alignment (e.g., convergence) among embeddings of vectors within a semantic space based on rankings of natural language texts represented by the vectors. In some examples, a classification may be an indication of a relative preserved distance between a high-dimensionality input and a reduced dimensionality output within an embedding space. Some example machine learning models may include one or more embedding layers at which information or data (e.g., any data or information discussed herein in connection with example models) is converted into one or more vector representations. The one or more vector representations of the message may be pooled at one or more subsequent layers to convert the one or more vector representations into a single vector representation.

In some embodiments, a machine learning model 302 may be structured as a factorization machine model. A machine learning model 302 may be a non-linear model or supervised learning model that can perform classification or regression. For example, the machine learning model 302 may be a general-purpose supervised learning algorithm that a system uses for both classification and regression tasks. Alternatively, the machine learning model 302 may include a Bayesian model configured to perform variational inference (e.g., deviation or convergence) of an input from previously processed data (or other inputs in a set of inputs). A machine learning model 302 may be implemented as a decision tree or as an ensemble model (e.g., using random forest, bagging, adaptive booster, gradient boost, XGBoost, etc.). In some embodiments, a machine learning model 302 may incorporate one or more linear models by which one or more features are pre-processed or outputs are post-processed, and training of the model may comprise training with or without pre or post-processing by such models.

In some embodiments, a machine learning model 302 implements deep learning via one or more neural networks, one or more of which may be a recurrent neural network. For example, some embodiments may reduce dimensionality of high-dimensional data (e.g., with one million or more dimensions) before it is provided to the reinforcement learning model, such as by forming latent space embedding vectors (e.g., with 500 or fewer dimensions) based on high dimension data as described in various embodiments herein to reduce processing complexity, and in some cases may reduce a subset of the high dimension data indicative of distance between different inputs to a degree that supports representation of outputs within a 3-D visualization space. In some embodiments, the high-dimensional data may be reduced by an encoder model (which may implement a neural network) that processes vectors or other data output by a NLP model. For example, training of a machine learning model 302 may include the generation of a plurality of latent space embeddings as, or in connection with, outputs 306 of the model which may be classified (e.g., ranked during one or more sessions of evaluation). Different ones of the models discussed herein may determine or perform actions (e.g., like sampling) based on unexplored or unraked space embeddings and known latent space embeddings, and based on distances between those embeddings, or determine scores indicative of alignment of users that are evaluating the content represented by the embeddings (e.g., based on rankings of users provided for embeddings and distances between embeddings).

Examples of machine learning model may include multiple models. For example, a clustering model may cluster latent space embeddings represented in training (or output) data. In some cases, rankings or other classification of a (or a plurality of) latent space embedding within a cluster may indicate information about other latent space embeddings within, or which are assigned to the cluster. For example, a clustering model (e.g., K-means, DBSCAN (density-based spatial clustering of applications with noise), or a variety of other unsupervised machine learning models used for clustering) may take as input a latent space embedding and determine whether it belongs (e.g., based on a threshold distance) to one or more other clusters of other space embeddings that have been previously trained. In some examples, a representative embedding for a cluster of embeddings may be determined, such as via one or more samplings of the cluster to obtain rankings by which the representative embedding may be selected, and that representative embedding may be sampled (e.g., more often) for ranking against other embeddings not in the cluster or representative embeddings of other clusters.

Figure 3B:
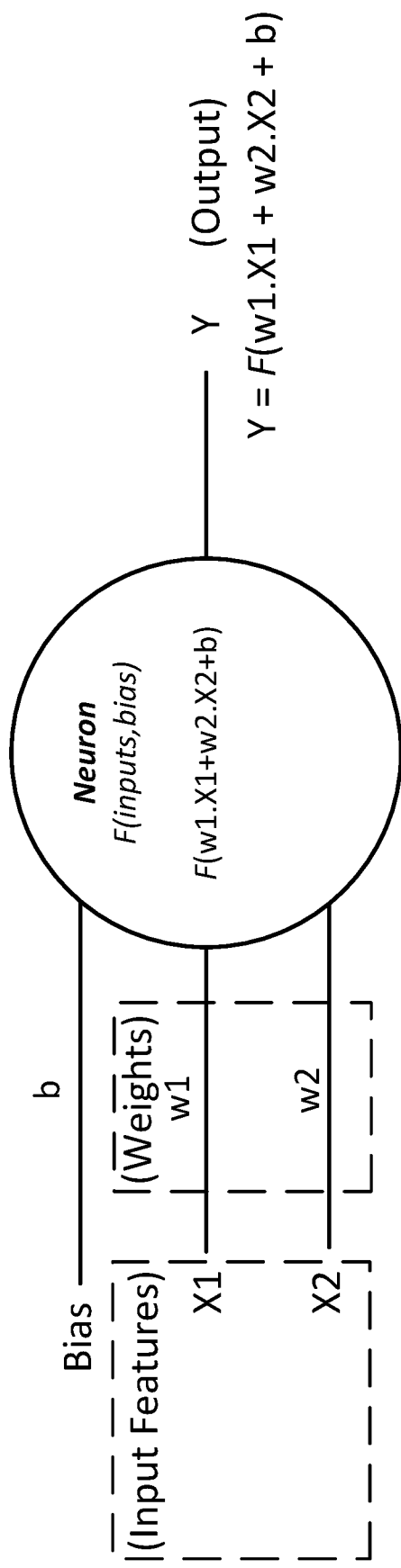
FIG. 3B is an example component of a machine learning model in accordance with some embodiments.

FIG. 3B is an example component of a machine learning model in accordance with some embodiments. FIG. 3B illustrates an example neuron of a neural network that receives inputs and produces an output in accordance with some example embodiments. As shown, the example neutron may generate an output Y based on the features X1, X2 input to the neuron and the associated weights w2, w2 and bias b. Illustrated is an example of single neuron, however, a neural network may include a plurality of neurons with respective weights and biases and which respectively receive one or more features of an input feature set, like an input vector. In some cases, an input of a neuron may be an output of one or more other neurons or an output of the neuron fed back into itself as an input.

Each neuron may utilize a function F of inputs and biases to determine its output Y. In some examples, The function F may take the inputs as products of the features X1, X2 and the weights w1, w2. The products of the features X1, X2 and weights w1, w2 may be summed together, along with the bias b, before it is provided to the function F of the neuron. The product of the features X1, X2 and weights w1, w2 may be a scalar product, a vector product, a matrix product, or any combination of these three products. The weights w1, w2 may be determined through a machine learning algorithm that utilizes the neuron (or any number of neurons), where the weights may be determined based on activation of a single neuron or multiple neurons.

A plurality of neurons may be combined to create a layer in a neural network machine learning algorithm. Embodiments of a neural network may have one, five, ten, or a hundred or more layers, or other number. The number of neurons in each layer may be the same throughout all layers, or the number of layers may differ with each layer. Each layer in the neural network may have neurons with a different bias term b and weights w1, w2, or a bias or weights may be the same for one or more or all of the neurons in a layer. Training of a neural network may determine the value of the weights for each neuron by means of backward propagation techniques, or gradient decent, or other optimization algorithm to reduce output error. The weights w1, w2 may be a scalar, a vector of dimensions D, or a tensor of dimensions M×N, where D, M and N are integer values.

The neuron may use a function F that is of the form of a sigmoid function, a Softmax function, or a linear function. The weights w1, w2 may be determined from a minimization process, such as a gradient descent process, or through backwards propagation techniques, through the use of skips between layers, or a combination of these techniques. Collectively, the neurons in the neural network may be trained using a supervised algorithm or an unsupervised algorithm, and in some cases may be trained end-to-end.

In some embodiments, the Hopfield model is used to link deep learning to measurements of alignment in responses by multiple intelligences (human or non-human, like machine learning models). The Hopfield model is based on the Ising model for magnetism. In the Hopfield model, the exchange energy of the Ising model is changed to $w_{ij}$ to map spin alignment to input neuron alignment, e.g.:

$$E = -\frac{1}{2}\sum_{ij} w_{ij} s_i s_j + \sum_i \theta_i s_i$$

The $w_{ij}$ term of the Hopfield model corresponds to a strength of interaction between neurons $s_i s_j$ and $\theta_i$ corresponds to the activation threshold of neuron $s_i$. The Hopfield model, in relation to the above example neuron, can be characterized by example neurons si and sj that have lower free energy when they are correlated, thus forming a basis for encoding the notion of associative memory within a neural network. This construct for deep learning can be applied to measuring alignment in responses to stimuli to create macroscopic behavior patterns within the context of expert systems and knowledge discovery. To illustrate, assume two entities that produce responses and rankings of responses are represented by $s_i s_j$ in the above model. The output, E, may be considered as a measurement of the strength of interaction between $s_i$ and $s_j$. The output E of the interaction is minimized when they align. Non-alignment means there is excess free energy in the system. Depending on the category of alignment different outcomes may be evident, for example, exchange of energy is minimized as increasing numbers of nearest neighbor interactions (e.g., rankings of responses related by distance within a semantic space) indicate agreement. Learning alignment (e.g., getting to true alignment of intelligences as indicated by their responses) can impact the speed and accuracy with which the collection of intelligence may reach a result. Unresolved free energy leads may be indicative of unwanted arbitration between systems that may occur upon implementation of action, which may slow down the ability of a network of systems to act efficiently.

In some embodiments, a probability of evidence matching a collection of outcomes is represented by:

$$p(e) = \sigma[-H(e) - \mu]$$

where H(e) is the Hamiltonian of energy of the system, which in a formulation of Bayes Rule is, for a hypothesis G, $$H_G(e) = -\ln(P(e|G))$$

and where σ is the Softmax function, and μ is the bias term, given as $$\mu = -\ln(P(G))$$

Deep learning techniques described herein may comprise the construction of an n layer neural network to learn H(e), where n may vary with network design parameters, and in some example embodiments n may range from 3 to 10 layers, or in some cases more. The Hopfield Hamiltonian is equal to the Hopfield model energy E. For deep learning, H(e) may use the same process as the H(e) for learning the sample function for relevance learning. Thus, a learning mechanism may be created that learns alignment of responses for predictions by a diverse group of intelligences. The function p(e) may be interpreted in terms of either deep learning where an n-layer neural network is sought to compute H(e). Minimizing the free energy of the Hopfield model, which is equivalent to minimizing the free energy of the Ising model, determines the alignment of the responses to the open-ended responses as indicated by rankings of the users (noting that a given user, in accordance with example embodiments, may rank, individually, only a small subset of response (e.g., via one or more rankings of sampled responses) relative to the total number of responses received (which may be ranked by other users)).

The neurons in the neural network may be trained used a training dataset followed with the use of a validation dataset to determine if the weights w1, w2 accurately predict the outputs associated with the validation dataset. In some examples, the validation set may be selected based on feedback received or detected for the outputs. Thus, for example, the network may be iteratively trained as it generates outputs and feedback is collected for the results. If the neurons in the neural network with the weights w1, w2 do not accurately predict the outputs associated with the validation set, the neural network may reinitiate the process to determine new values for the weights w1, w2, where the weights w1, w2 may be randomly determined at the beginning of the training process and modified using backwards propagation techniques to determine the new values of the weights w1, w2. The output Y of the neuron in the neural network may be a single scalar, a single vector, or a single tensor, or the neuron may have multiple outputs Y, where each output may be a scalar, a vector, or a tensor. The output Y of the neuron may be input as a feature in a second neuron that is located in a deeper layer of the neural network.

Figure 4A:
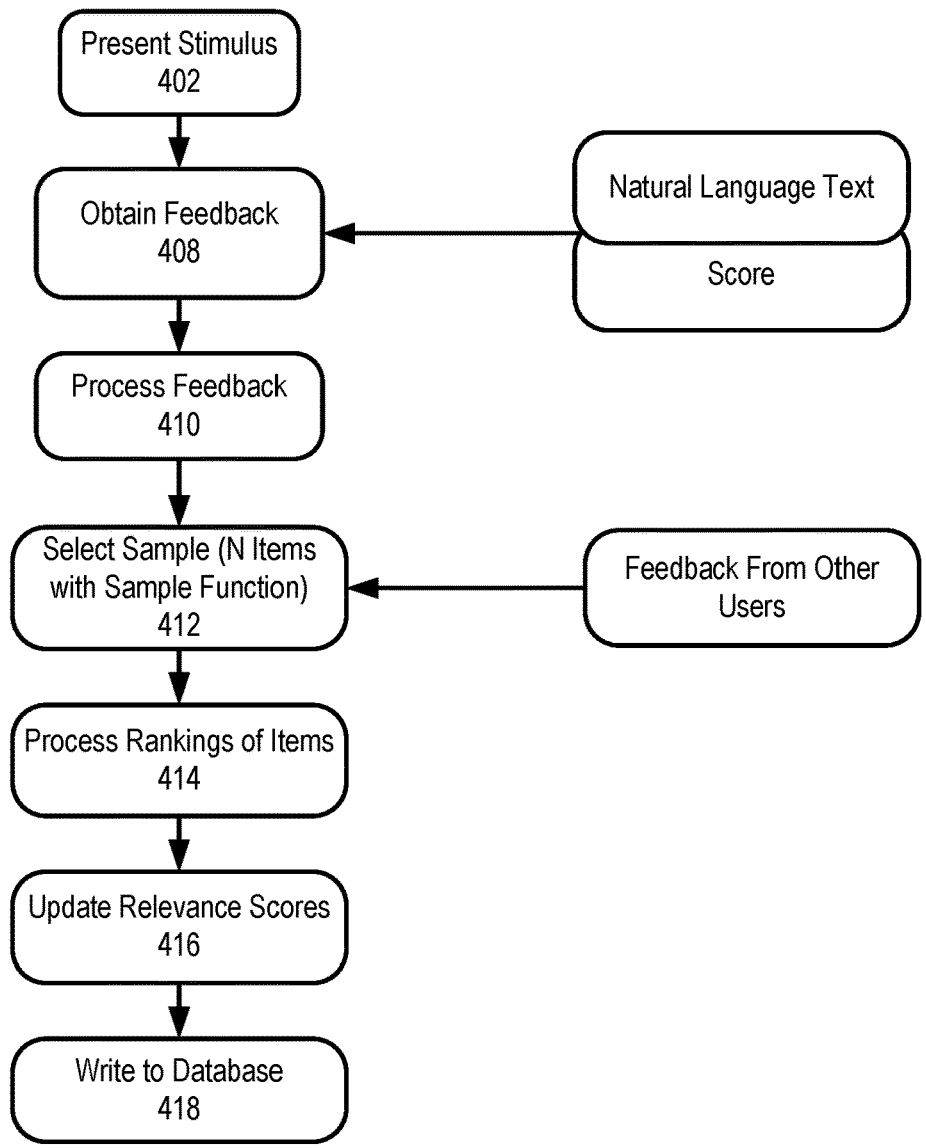
FIG. 4A is a flowchart of an example process for determining relevance scores upon which measures of alignment may be based, in accordance with some example embodiments.

FIG. 4A is a flowchart of an example process 400A for determining relevance scores upon which measures of alignment may be based, in accordance with some example embodiments. In some example embodiments, a server, like an expert system 102, or other computing device, may execute the process 400A to update relevance scores (or obtain data by which relevance score may be updated) based on user feedback obtained for a stimulus.

In some embodiments, a server determines a stimulus to present 402 to a user. For example, the server may select a stimulus from a pre-defined set of stimuli corresponding to different features of a decision, product, or other topic for evaluation. In some examples, stimulus 402 may include one or more evaluation questions related to the stimulus, which the user may score or otherwise rate and provide a response (e.g., reason) for the provided score or rating.

In some examples, the stimulus may be selected from a set of stimuli, where the set of stimuli may be accessed from a database. Examples of decision or topic for evaluation may include investing, marketing, hiring or promoting employees, seeking intellectual property rights, or expanding into other markets. Each stimulus may correspond to a feature for which feedback is solicited from users participating in the evaluation. An example set of stimuli may include different generators for inquiry in relation to the decision or topic. For example, different stimuli may initiate some component of an investigation to understand how to the users respond to difference aspects informing a decision or topic. For example, an evaluation of a topic concerning an employer may include a set of stimuli including (but not limited to) how do the users feel about increasing employee benefits?, what are the users concerns for growing the business?, who do the users think would make the best candidate for a company's CEO?, among others. An evaluation may be performed within other domains, such as evaluation of a product (or potential product), where the set of stimuli may include images of the product, specifications of the product, etc., and associated questions may be related to the particular stimulus (e.g., about the design or color, or whether the specifications meet or exceed user needs, etc.).

In some embodiments, the server may obtain feedback 408 in relation to a stimulus. For example, the server may receive from a user device 104 of the user for which the stimulus was selected, feedback via a webpage accessed by the user device 104 or application executed by the user device 104. The obtained feedback from the user in response to the stimulus may include, but is not limited to, one or more of natural language text (structured or unstructured) and a score for the stimulus presented to the user. A score may be an explicit score (e.g., assigned by a user), or it may be based on one or more implicit metrics (e.g., how long a user spent on a screen, how much text a user highlighted, or a user skipping a question presented to the user in association with the stimulus).

For example, to obtain feedback 408, in some embodiments, evaluation questions corresponding to a stimulus may be presented to the user via a user interface. The server may provide (e.g., collectively or in a sequence) the set of questions to the user in the form of open-ended responses via a graphical user interface. A user may answer all or a subset of the evaluation questions provided. The open-ended response may be accompanied by a quantitative score (e.g., 1 to 10) of the stimulus based on the evaluation question. In some examples, an evaluation question may only take a quantitative score and does not feature an open-ended response. An evaluation question may be presented with a binary option to indicate if the user agrees with the evaluation question. For example, an evaluation question may be "do you believe we should purchase company X?" The user may respond to the question using a drop-down menu to indicate that they agree (e.g., by selecting a text based option such as 'True" or "Yes", or selecting a color, such as green out of a list of presented colors) or disagree (e.g., by selecting a text based option such as 'False" or "No", or selecting a color, such as red out of a list of presented colors). A user may provide feedback with respect to each of a plurality of questions (e.g., 5, 7, 10, or more) for a stimulus. A user need not provide feedback with respect to each question during a single session, but rather may provide feedback for a first question at a first time, and then provide feedback for a second question at some later time.

In some embodiments, the server may process 410 the obtained feedback. In some examples, the natural language text may be converted to a vector (e.g., via Word2Vec or BERT) in a semantic space. In some examples, a quantitative score (which may accompany a supplied natural language text response) may be determined based on one or more of an explicit score provided by the user or an implicit score associated with the user. The results of the processing, such as the natural language text, corresponding vector in the semantic space, and the score (either implicit or explicit or combined) may be stored within a database in association with an indication of the stimulus (which may include an indication of the evaluation question by which feedback was solicited for the stimulus) and the user that provided the feedback.

In some embodiments, the system may obtain, such as by other iterations of the process 400A presenting the stimulus to other users, feedback from those other users in the form of natural language text submitted from previous users. The natural language text submitted from previous users may be processed 410 (e.g., natural language text into a vector in a semantic space using Word2Vec or BERT) for evaluation by the user and provided to a sample function (and the feedback obtained from the user may be processed 410 and may be sampled by the sample function for other users).

The sample function may select N items 412 represented in feedback obtained from other users as a sample to present to the user. The sample may be selected with a sampling function (e.g., as described in more detail with reference to FIG. 4B) in accordance with example embodiment described herein.

For example, in some embodiments, a server presents a sample of previously submitted unstructured data responses via a graphical user interface. The server may execute a sampling function to select, from a set of previously submitted user feedback responses obtained for a feature, a subset of those responses for display within an interface in association with the stimulus and the question for which feedback from the user was obtained 408. For example, after a threshold number of user feedback responses are received for a feature, a subset of previous responses submitted by users are selected by the sampling function to be presented to a current user.

Presented with the set of N sample items via a user interface, the user may rank the selected N samples relative to each other. The ranking of the samples selected for the subset of responses may be implemented as an A/B test. For example, the ranking may be performed by indicating ranked order among the selected N samples. The rank, e.g., highest to lowest, may correlate with how well the user aligns with the selected N samples in relation to the stimulus or question and stimulus. For example, the selected N samples may be natural language text and the user may rank each item based on how well the user agrees with the natural language text response provided by other users in relation to the stimulus or stimulus and question.

In some embodiments, the user may indicate a numbering scheme to assign which items in the selected N samples have the highest alignment with the user (e.g., if the size N is equal to 10, the user may assign a 1 to the natural language response the user agrees with the least and a 10 for the natural language response the user disagrees with the most, with the other responses being assigned one of the values of 2-9). The user may drag and drop the natural language responses via graphical user interface on a user device to create a column that correlates to how well the user agrees with the response. For example, a response at the top of the column may be the response the user agrees with the most while the response at the bottom of the column may be the response the user agrees with the least.

In some embodiments, the user may also assign a to one or more of the ranked items. For example, the user may assign a score out of 100 to indicate how well the user agrees with a particular response, where a score of 1 indicates the lowest agreement and a score of 100 indicates the highest agreement. Thus, for example, the user may indicate whether they do not agree with a highly ranked response (e.g., as a best choice available) or whether the user agrees with a lower ranked response (e.g., because the user aligned with many of the choices available). The user may assign the same score to multiple response in the selected N samples, or the user may choose to not assign a score to a response.

After the user ranks the items, the server may receive and process the rankings 414 of the items. For example, the server may update a win/loss matrix based on the user rankings of the sample items. For example, for a subset of responses $h_1$-$h_{10}$ provided to and ranked by a user, the server may receive ordering information indicative of an example ordered ranking (e.g., first to last) of $h_9$, $h_7$, $h_4$, $h_1$, $h_2$, $h_3$, $h_{10}$, $h_5$, $h_6$. The ordered ranking may be conceptualized by illustrative example as a win/loss matrix:

|    | $h_1$ | $h_2$ | $h_3$ | $h_4$ | $h_5$ | $h_6$ | $h_7$ | $h_8$ | $h_9$ | $h_{10}$ |
|----|---|---|---|---|---|---|---|---|---|---|
| $h1$ | 0 | 1 | 1 | 0 | 1 | 1 | 0 | 0 | 0 | 1 |
| $h2$ | 0 | 0 | 1 | 0 | 1 | 1 | 0 | 0 | 0 | 1 |
| $h3$ | 0 | 0 | 0 | 0 | 1 | 1 | 0 | 0 | 0 | 1 |
| $h4$ | 1 | 1 | 1 | 0 | 1 | 1 | 0 | 1 | 0 | 1 |
| $h5$ | 0 | 0 | 0 | 0 | 0 | 1 | 0 | 0 | 0 | 0 |
| $h6$ | 0 | 0 | 0 | 0 | 0 | 0 | 0 | 0 | 0 | 0 |
| $h7$ | 1 | 1 | 1 | 1 | 1 | 1 | 0 | 1 | 0 | 1 |
| $h8$ | 1 | 1 | 1 | 0 | 1 | 1 | 0 | 0 | 0 | 1 |
| $h9$ | 1 | 1 | 1 | 1 | 1 | 1 | 1 | 1 | 0 | 1 |
| $h10$ | 0 | 0 | 0 | 0 | 1 | 1 | 0 | 0 | 0 | 0 | where the $h_i$ row values correspond to wins and the $h_i$ column values correspond to losses for pairwise combinations of responses. For (row, column)=($h_i$, $h_i$), the win/loss matrix value may be defaulted to zero (e.g., because the response cannot win or lose over itself).

The win/loss matrix may preserve the ordered ranking. For example, $h_9$ as the highest ranked response, may include row values with respect to each of the other possibilities of h set to 1. As shown, the row corresponding to $h_9$ has all entries (other than for $h_9$ as explained above) set to 1 in order to indicate its order as before all other entries. Conversely, because $h_6$ is the lowest ranked response, the row corresponding to $h_6$ has all 0 entries to indicate that all other responses rank higher than $h_6$.

In some embodiments, the win/loss matrix dimensions are different for multiple users. The server may use the sampling function to select a set of responses to present to a user. The set of responses may be the same or different between users. The dimensions of a local win/loss matrix, a win/loss matrix generated for a single user during a single ranking event, are determined by the number of responses that are provided to a user for ranking and may change as a function of time. Relevance scores of the presented responses may be computed based on the win/loss matrix once the user finishes ranking the presented responses generated by the sampling function. In some examples, a global ranking of responses for all users performing respective rankings of responses may be constructed, such as by combining multiple local win/loss matrices to determine a global win/loss matrix. A global win/loss matrix of dimensions d may be represented by multiples bases, where the basis used to present the local win/loss matrix may be different between users. For a global win/loss matrix to be formed from multiple local win/loss matrices, a basis transformation may be performed on the local win/loss matrices to ensure that the global win/loss matrix accurately reflects the ranking from all users. The alignment scores for users may then be calculated using the global or local win/loss matrix. Thus, the obtained rankings of the responses presented to the user may be factored into a win/loss matrix that combines the rankings of a plurality of users for each response which has been sampled and ranked (e.g., by at least one user). When the global win/loss matrix is updated, the global win/loss matrix may be used to update the relevance scores of the open-ended responses.

To update relevance scores 416, in some examples, the server may model a context for a stimulus as a tensor. For example, the process 400A may be a discrete event process that occurs over some time interval T within the scope of a context H, or focalFrame. Each ranking event in the discrete series may occur at a time $t_i \in T$. Parameters of the process, as described above, may include the number of evaluators or participants or users M and the number of ranking events w provided. An evaluation question EQ, or feature, as described above, may be a natural language question or other prompt that defines a scope of context H (or focalFrame), and a set of EQs may correspond to features by which an evaluation (e.g., for one or more contexts concerning an evaluation for which the process is executed) may be modeled.

A tensor H modeling of the context may include vectors corresponding to respective responses, and values of a vector may correspond to properties of the responses, such as semantic distances, rankings, or other properties. For example, the elements of tensor H may be vectors for each response that define relevance with respect to other responses and a measure of semantic distance from other responses (e.g., based on distances between outputs of a NLP model for respective natural language texts). The elements of H may take the form:

$$H_{ij} = [h_w, h_d, h_r]$$

A win count of a response h within the context H, or $h_w$, may be a count of wins of $h_i > h_j$ from the ranking events $\omega$ for responses:

$$h_w = \sum_\omega \sum_i \sum_j h_i > h_j$$

A relative semantic distance, $h_d$, between $h_i$ and $h_j$ may be represented by:

$$h_d(h_i) = \sum_j h_d(h_i, h_j)$$

A relevance probability, $h_r$, may be the probability of relevance of a response with respect to all other responses. The matrix form of H may be structured based on wins, semantic distance, and relevance probability for each h.

$$\begin{array}{c} \\ h1 \\ h2 \end{array} \begin{bmatrix} h_1 & h_2 & h_n \\ [\text{wins, }semd,\text{ }rel] & \dots & [\text{wins, }semd,\text{ }rel] \\ \vdots & \ddots & \vdots \\ [\text{wins, }semd,\text{ }rel] & \dots & [\text{wins, }semd,\text{ }rel] \end{bmatrix}$$

The server may determine a distribution for all responses provided by users or a subset of the responses with the highest relevance scores. In some embodiments, a relevance distribution may be calculated based on the vectors corresponding to ranking events $R_i$, where the subscript refers to a ranking event: $R_1 = \{h_{1Rel}, h_{2Rel}, \dots, h_{nRel}\}$ at $\omega = 1$. To calculate R at any point in the process, an adjacency matrix may be constructed by the form:

$$h_w = \sum_\omega \sum_i \sum_j h_i > h_j$$

The adjacency matrix may be converted to a transition matrix by normalizing the matrix into a probability matrix. By applying the matrix power law, the largest eigenvalue/eigenvector may be computed:

$$R_{t+1} = TR$$

where the determined result, e.g., $R_{t+1}$ after a ranking event R, may correspond to a probability distribution of responses in the sense that the values of, for example, eigen vectors are indicative of rank ordered probabilities of relevance based on the ranking events. As discussed elsewhere herein, a similar technique may be executed to determine a probability distribution of influence of each participant (e.g., based on how other users rank or rate responses submitted by that user).

The server may indicate which responses indicate outliers in the ranking or distribution. The server may request, via a graphical user interface, for the probability distribution to be recomputed without outliers, or the server may request subsequent action regarding the outlier once the relevance scores and probability distribution are computed. A measure of alignment in the ranked responses may also be presented to a user along with the relevance scores and probability distribution. An alignment measurement may be a quantitative value (e.g. 1 to 100) or a qualitative value (e.g., A through F) used to indicate the compute alignment associated with the relevance scores and probability distributions of the ranked responses. The server may present more than one alignment score, for example, an alignment score from considering all relevance scores or an alignment score for the set of relevance scores without the inclusion of any outliers.

In some embodiments, a theme relevance may be derived from the relevancy distribution of responses within a given theme. The server may generate a ranking of responses based on their relevance θ for each context. Each response in a probability distribution P(r) may be linked to a quantitative score (e.g., a score that was provided in association with the response) in examples where an evaluation question request feedback in the form of a quantitative score in addition to a response. The probability distribution P(r) may be indicative of a predicted outcome of an evaluation. While this process reduces the volume of relevant responses, the explanatory value benefits from grouping response into thematic categories called themes. The theme relevance $T_r$ may be inferred from a distribution P(r) of the relevance score of $h_i$. The individual themes need not be mutually exclusive. The relevance of a response $r_i$ may be expressed as $R = \{r_j\}:P(r_i)$. A theme may be a subset of R resulting from an NLP classification, such as a shared classification within semantic space (e.g., identification of a theme corresponding to a natural language text as described herein). In some examples, definitions for theme relevance may include a maximum of P(r), a mean of P(r), or a combination of taking the mean of a top-ranking portion of P(r). Embodiments may infer a sentiment (e.g., based on scores) for a theme based on the scoring pattern associated with the quantitative score attached to $r_i$. In some examples, $r_i$ may belong to multiple themes (e.g., embodiments may select a set of themes identified for a natural language text, like themes having above a threshold score).

In some embodiments, the server may determine an embedding of each response (based on its natural language text) in a vector space by which semantic distances between responses may be calculated, or themes for responses may be inferred, such as to score relevance of responses or update relance scores of responses as described above after one or more ranking events. Once the relevance scores are updated 416, the relevance scores may be written to a database 418. The database may change the relevance scores of the presented natural language text responses, or it may store multiple sets of relevance scores, where each set of relevance scores correlates to a different user.

The relevance scores of the responses may be used to indicate which responses align with the users who provided alignment scores. The relevance scores of responses to an evaluation question may be normalized to a scale of 1 to 10 or 1 to 100. A lowest value (e.g. 1) may indicate that the relevance score is low for the set of users (e.g., users did not align well with that response) and a highest value (e.g. 10 or 100) may indicate that the relevance score is high for the set of users (e.g., users are aligned with the open-ended response).

In some embodiments, the server determines an output indicating the relevance score for all ranking events the server receives from users. The relevance score may be presented as list of open-ended responses with their respective quantitative relevance score. The presented scores may include those for the top 5, 10, 25 or more responses with the highest relevance scores. The presented scores may be the top 5 scores as well as the bottom 5 scores. Relevance scores may be presented as probability distribution, where the distribution may be presented as an analytical function or a graphical distribution.

In some embodiments, the process may produce a probability distribution over a list of options of any size, which may include training of a probabilistic model that processes samples and rankings to infer results that would otherwise require scaling of an A/B testing (which, on its own, A/B testing does not scale, which is not to suggest that such a configuration is disclaimed), and a measure of confidence, like a score, in the degree to which the results are indicative of alignment. In some embodiments, the probability of a joint distribution of the sequence of rating event states over time is given as:

$$P(R_{1:T}, \beta_{1:\Omega}) = P(R_1)P(\beta_1 R_1) \prod_{\omega=2}^{\Omega} P(R_\omega \mid R_{\omega-1})P(\beta_\omega \mid R_\omega)$$

A Bayesian model may be trained to learn the true ranking of responses from the sequence of rankings. At completion, the true ranking to be learned, $\theta$, may represent the collective relevance ranking for the stimuli or evaluation question for the stimuli:

$$P(\theta \mid \beta) = \frac{P(\beta \mid \theta)P(\theta)}{P(\beta)}$$

When a group's intelligences (either human or artificial agents) is aligned, the sample list $\beta$ closely estimates the true shared prioritization based on the rankings in a context. In this case, $L(\theta)$—the log likelihood for the evidence—is maximized:

$$L(\theta) = L(P(\beta \mid \theta)) = \sum_R \log(P(\beta, R \mid \theta))$$

Each time a ranking event happens, R is updated and a new $\beta$ is generated—a sequence of models of a context response relevancy that evolves over time. The collective reasoning evolutionary trajectories detail how different user rankings and alignment of users form around the universe of responses. Maximizing $L(\theta)$ is simplified by noting that any distribution Q(R) over the hidden variables is a lower bound to $L(\theta)$ as the log function is concave (otherwise known as Jensen's identity). Thus, $L(\theta)$ may be expressed as:

$$L(\theta) = \sum_R Q(R)\log(P(R, \beta \mid \theta)) - \sum_R Q(R)\log(Q(R))$$

which shows that $L(\theta)$ is equal to the negative of the Gibbs free energy.

When $\beta$ samples a list, such as the collection of responses to a question, that matches the true value $\theta$ of user alignment, the free energy is minimized. Measuring and categorizing the free energy of rankings for responses may be used (e.g., scored) as a predictor of alignment of among users.

Figure 4B:
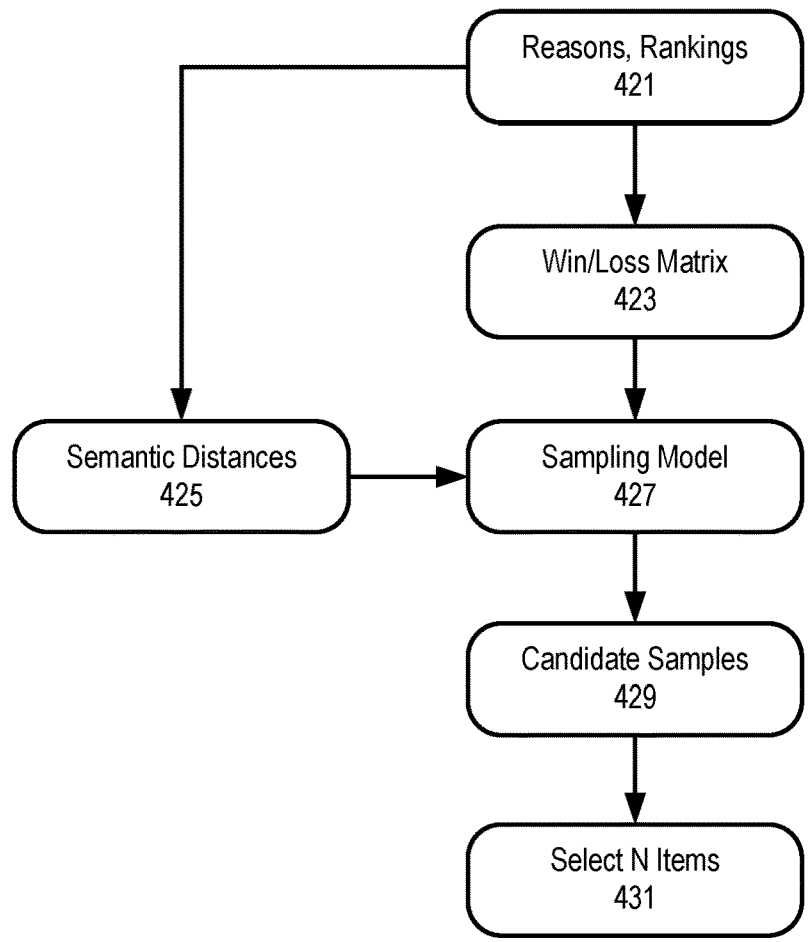
FIG. 4B is a flowchart of an example process for sampling a semantic space that balances exploration and optimization, in accordance with some example embodiments.

FIG. 4B is a flowchart of an example process 400B for sampling a semantic space that balances exploration and optimization, in accordance with some example embodiments. In some embodiments, to efficiently determine a global ranking of all responses in a set of submitted responses, A/B testing may be performed on a plurality of different subsets by a plurality of different users evaluating respective samples of items output by a sampling model (or function). If the A/B testing were performed on the whole set of all submitted responses, the system may exhibit excessive degradation of efficiency at scale as traditional A/B testing techniques are prohibitively expensive (e.g., in time, and complexity) as the number of pairwise rankings required increases exponentially. Instead, the system may evaluate the results of the A/B testing performed on all of the rankings of subsets to determine a global ranking of responses within the set of all responses.

In some embodiments, a sampling model is used to determine global ranking efficiently and with sufficient coverage of different responses. Specifically, in many examples, the body of response may be too large to sample randomly, and naive selection techniques may redundantly cover some areas and not others. An efficient sampling function should span the semantic space of user responses (e.g., to give each response a fair shot) without impacting efficiency, and in some examples, may improve efficiency by recognizing and reducing presentation of many similar responses (e.g., in favor of a representative one that may reflect on the collection similar responses). New options may be added to the option list at any time. The sampling process may have a starting point (e.g., beginning of an evaluation) and a stopping point (e.g., based on a determination by the sampling model or other model based on outputs of the sampling model). In some examples, the process may start with a seed list of options with all options having equal probability of preference. Participants (human or intelligent agents) may propose new options which may be added to the list of options. Participants may be provided a sample list of options and asked to select and rank items in priority element of A/B tradeoff (e.g., is x liked over y in the sample list)—A/B tests are commonly used to detect selection preferences. For example, if a testing process has 10 options used to learn a ranked preference, at least 45 A/B tests are required to properly rank the 10 options. With one or more A/B tests of subsets completed, the process may translate the priority list into a win/loss matrix.

For example, unstructured data responses may be selected by a sampling function for presentation to a user, where the sampling function chooses N items from the database containing responses to an evaluation question. As described previously, a user may rank an unstructured data response by dragging and dropping the response in a certain order or assigning a numerical value to the response (e.g. a value of 1 indicates highest ranked response and N indicates lowest ranked response). The user ranking of the responses may be used to prioritize the presented responses based on how they align with the user. The response that the user aligns with most receives the highest ranking or alignment score, while the response that the user aligns with the least receives the lowest ranking or alignment score. For a single scoring event the server may receive a vector or position information indicative of ordered rank 421 of the responses (e.g., a ranking of the items in the sample set). Scoring events across multiple users for different sets of response for which respective users indicate their rankings may be processed to construct a global win/loss matrix 423, for example, indicative of response rank for all users (e.g., at a period during, or after, an evaluation).

Responses 421, like natural language text responses, may be processed to determine distances between different responses within a semantic space. These semantic distances, such as between pairwise combinations of responses, may indicate which responses are neighbors to each other (e.g., based on a threshold), which responses are not near any other response (e.g., based on a threshold), and those somewhere in-between. The sampling model 427 may take into account these distances and other data to efficiently sample responses across the semantic space.

In some embodiments, a sampling model 427 may include a probabilistic model of scalable A/B testing (on their own, A/B testing does not scale, which is not to suggest that any method is disclaimed). The process may include determining a probability distribution over the list of options and a complete ranking of all options, based on their performance in the A/B tests. To create the probabilistic graphical network based on structured evaluation, the process takes structured inputs. In some examples, an unstructured data may be processed in accordance with one or more models described herein to generate an input set or determine features of inputs. In some examples, inputs may include a linear model comprising a set of features ($F_1$ to $F_n$), where for each $F_i$, participants submit a score and response. The system generates a sample using the sampling function $\beta$ and uses free text strings with a set of proprietary parameters (relevance, link to a score). A classifier generates conditional probability tables for each F, mapping a response to probable scores. Conditional probability tables are generated, linking score to probable model outcomes and the mechanism automatically calculates the following function for structured (or in some examples, unstructured) evaluations:

$$P(\text{Outcome} \mid \text{CollectiveReasoning}) = P(\text{Outcome} \mid EQ_1, EQ_2, \ldots EQ_l)$$

$$\prod_{k}^{l} P(EQ_k \mid \text{Theme}_{EQ_k}) \prod_{i=1}^{m} P(\text{Theme}_i \mid \text{Reason}_{\text{Theme}_i}) \sum_{j=1}^{n} P(\text{Reason}_j)$$

The P(Reason) (or response) may be learned from a relevance learning algorithm. In the final state of any process there will be a P(Reason) distribution that yields a representation of the prioritized responses within a context frame (e.g., like a focalFrame). This represented the prioritized true beliefs θ of the collective. A Bayesian Belief Network may be trained as an executable representation of the collective intelligence of the group. For a trained model, a set of responses provided to the model will result in a predicted score without any human interaction.

In some embodiments, a sample of seed responses may be presented (e.g., generated responses to the question "what are the reasons for your score?). A collection of responses in a context at a state i is represented as $R_i$ and the set of seed responses are represented as $R_0$. In other examples, a user may not be presented with responses for ranking if none (or below a threshold number) exist, in which case $R_0$ may be initialized after a threshold number of a responses are received. A first person, $M_1$ may be asked to enter their response for their score. They are then asked to select responses they are aligned with from a sample of seed responses and to rank the selected responses in priority order of their degree of alignment. The process may leverage the law of comparative judgment, e.g., a reviewer is presented with an economic tradeoff between responses in the sample. The collection of responses $R_1$ increases with each step in the process. In addition, the ranking in the form of a scoring matrix, updates $R_1$. Each response in the collection may be assigned a score and a probability of relevance with each step. The system may satisfy the Markov property of only being dependent on the last state. Each sampling for $\beta$ may be taken from an R with an updated probability distribution. At any state of the system, $R_i$ may be considered a model of the world for this context. It is a population of responses, each with a probability, that represents the rank-relevant scoring by the participants. Semantic coverage of the context is important. Specifically, consider a scenario where many users are providing a same response to a question. Example embodiments may embed vectors based on NLP processing of respective responses in a reduced dimensionality vector space using an encoder model, and distances between vectors may be computed to determine the semantic distance between responses being sampled. A sampling function, β, may evaluate distances between responses.

In some embodiments, the data collection method comes from structured evaluation dialogues. A qualitative question is either in support of a quantitative scoring (e.g., reason for a number) or may stand on its own translative qualitative discussions to quantifiable predictions. Inputs to the qualitative question may be any object including images. The system then returns a relevance rank on the input object. In some embodiments, a sampling function is used to mimic the behavior of a facilitator, intaking all supplied responses while attempting to learn the alignment of the participants (e.g. learning the winning ideas). The sampling function may take the form:

$$\beta(\omega) \sim Q_d(1-\lambda(\omega)) + \lambda(\omega)Q_c$$

where the symbol—is to be read as sampled from. In the sampling function, $Q_d$ samples new $h_i$ (responses).

The sampling model should ensure that new ideas get sufficient opportunities to "win" over others—it is divergent or generative and is an information entropy increasing function and selects responses randomly while maximizing the semantic distance between responses. $Q_c$ is an entropy decreasing function that samples $h_i$ with the current highest probability of relevance and looks for emergent order based on alignment of support—it samples with the strategy of testing potential winners and is the dominant sampling function as the process matures to semantic coverage of the context.

A logistic map equation may model a population of responses in the context of a focalFrame is $\lambda$. Specifically, $\lambda$ may be described by the function $$\lambda = \frac{\chi_{n+1}}{\chi_{max}} = \rho \frac{\chi_n(1-\chi_n)}{\chi_{max}}$$

where $\chi_{max}$ is a parameter that estimates the total number of unique responses in the context and is dependent on the growth rate only, not the initial value, and $\chi_i$ is a single response in the context, and $\rho$ is the growth rate of responses coming into the system, such as to shift the attention from $Q_d$ to $Q_c$ based on estimated semantic coverage of the context defined by a focused question—and a value correspond to 2 implies a double of responses at each rating. When the growth rate is equal to 3, the iterations lead to two stable solutions.

In some embodiments, for a number of rating events $\omega$, $\lambda$ may start at 0 and approach 1 as $\omega \to \infty$. The sampling function may use a heuristic $\lambda$ with tuned parameters. The objective is to find a $\lambda$ that minimizes the number of prioritization events that lead to a convergence:

$$\text{Max}\left(\frac{d\lambda}{d|\omega|}\right)$$

This heuristic may also be referred to as conservation of a sample. An algorithm may define $\lambda$ as discrete function algorithmically. The process may be segmented over into n segments based on the number of ranking events $\omega$. With a number of items sampled N, $\lambda$ may be set to a value determined by a segment in the following process:
For i from 1 to n:
For |ω| in range segment:
Set $\lambda$ to value (segment)

$$\beta(\omega) \sim Q_d N(1-\lambda(\omega)) + \lambda(\omega) Q_c N$$

As an example, if $\lambda$=0, the sampling functions samples N $Q_d$ and zero $Q_c$. A simulation of the process may take a random list with known true values and then monitor the rate of convergence to the true ranking of the list based on how many items are rated by each entity providing rankings and the sample size. The algorithm may learns the top priority items quickly, while lower ranking items are known with less certainty. This means that the process is a reliable, scalable means to learn alignment of a group of any size. The result of the process is a rank-ordered set of responses based on shared relevance for a given context. The complexity of a potentially chaotic process is therefore reduced to a learnable set of responses. A semantic space defined by a focal question is thus represented by a peer-reviewed set of responses ranked in priority order.

Thus, the sampling model 427 may receive as input data rankings of responses based on a win/loss matrix and the semantic distances 425 between pairwise combinations of the responses and output candidate samples 429. The candidate samples 429 may be a selection of unstructured responses whose corresponding vectors satisfy a threshold distance between one another within the semantic space, among other factors described above. For example, candidate samples 429 may also be selected based on the ranking of the unstructured responses, where the ranking of the unstructured responses may be extracted from the win/loss matrix. In some embodiments, the candidate samples 429 may be filtered to remove responses which a user has already ranked, or the user provided, or are semantically similar to either.

The process may select N sample items 431 from the candidate samples 429 to be presented to a user for ranking or collection of other feedback. The number, N, of sample items selected may be indicated by user preference, configured by the system (e.g., 5, 7, or 10 or more or fewer), or other indicator. In turn, as described above, the user may provide a ranking or feedback via graphical user interface on a user device.

Context Control for Managing and Measuring Semantic Coverage

Natural language processing and natural language understanding systems have had suboptimal practical performance in areas such as accurate assignment of free form natural language text into topics that are aligned with external reasoning, whether human or artificial judgement. Embodiments of a process for context control may mitigate these and other issues by creating a measurable geometric space for a context, like a context of a problem solving, arbitration, decision, or evaluation context.

Figure 5A:
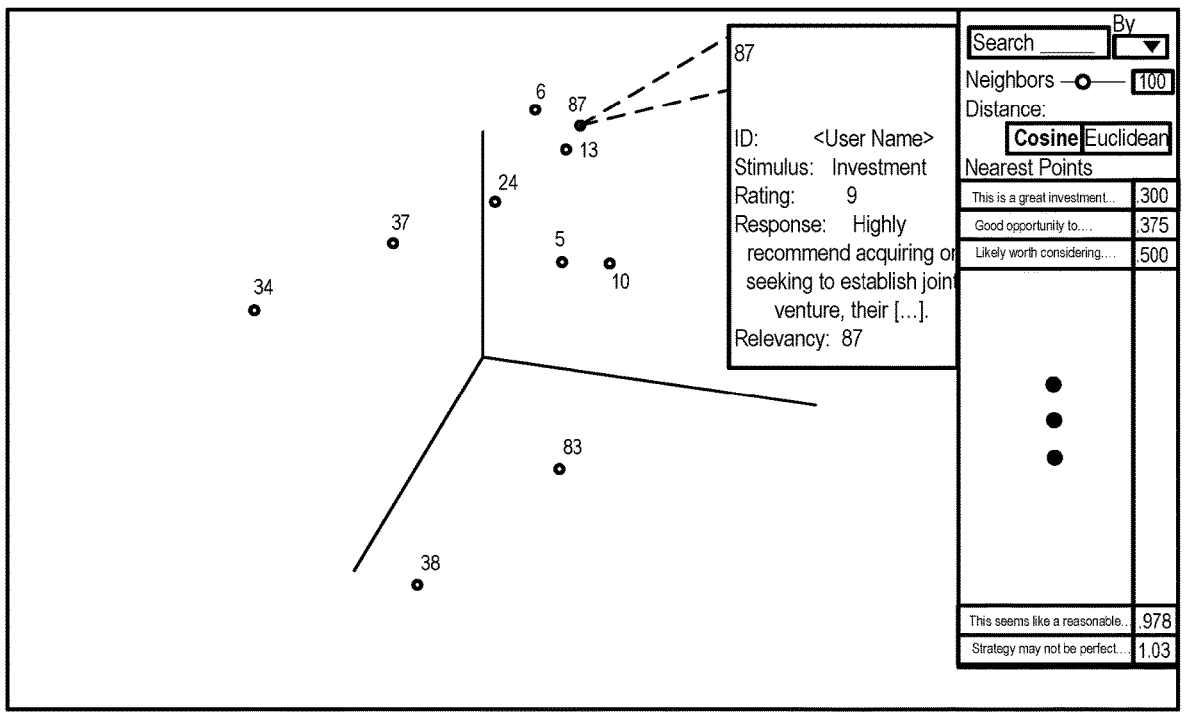
FIG. 5A and FIG. 5B illustrate examples of visualizations of a semantic space explored during an example evaluation and a user interface by which a user may interact with and modify visualizations, in accordance with some example embodiments.
Figure 5B:
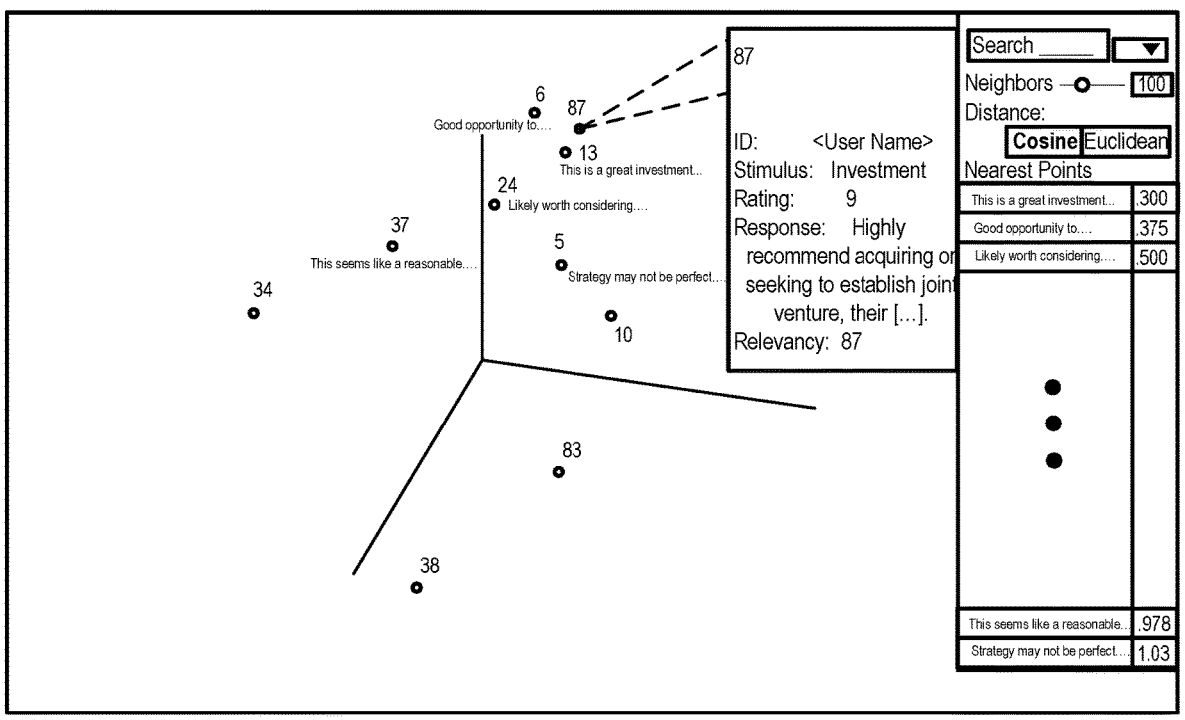
Figure 5C:
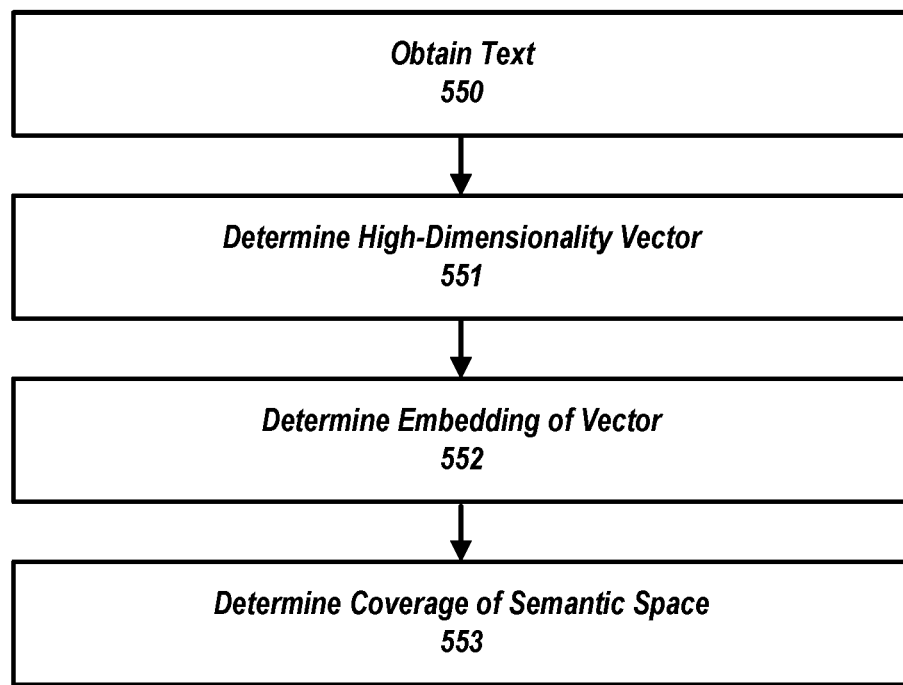
FIG. 5C is a flowchart of an example process for managing and measuring semantic coverage, in accordance with some example embodiments.

As described above, natural language texts may be processed, such as into respective vectors, by a NLP model. An output vector of (or intermediate vector within) an example NLP model may include over 500 dimensions, and in many cases 700-800 dimensions. Embodiments of a process 500, as shown in FIG. 5C, may manage and measure semantic coverage by defining geometric characteristics of a sematic space corresponding to an evaluation, such as its size or a relative distance matrix, based on the vectors of responses (e.g., natural language texts) received during the evaluation. In some embodiments, a system executing the process may generate a visualization of the semantic space. For example, FIG. 5A and FIG. 5B illustrate examples of visualizations of a semantic space explored during an example evaluation and a user interface by which a user may interact with and modify visualizations, which are explained in more details below.

In some embodiments, the process 500C includes obtaining 550 a natural language text. A text may be obtained when a user "submits" a response in an evaluation. The process 500C may include obtaining multiple such responses and performing one or more of the described steps with respect to each response.

The process may determine 551 a high-dimensionality vector representation of the text. For example, an n-dimensional vector output by an NLP model may uniquely represent the reason. In some examples, n may exceed 500 dimensions, and in at least one example use case, n may be 768. In some embodiments, an unstructured natural language processing (NLP) technique such as BERT or Word2Vec may process the text to generate the vector representation of the text.

The process may determine 552 an embedding of the vector within a semantic space. The semantic space may comprise the embeddings of each other vector corresponding to a respective text (e.g., of a response) received in the evaluation. The size of the semantic space may correspond to an n-dimensional space (e.g., corresponding to the n-dimensions of the vector representations of the responses) where each dimension ni is sized based on the range of ni values found in the vector representations.

In some embodiments, the process may determine 552 a latent space embedding of the vector within a semantic space having reduced dimensionality. For example, the semantic space may be limited to 2 or 3-Dimensions, which may afford visualization and may reduce processing overhead of text properties in downstream processes. In some embodiments, the high-dimensionality vector representation of a text is provided as input to an encoder model which outputs a vector with reduced dimensionality, such as vector having 2 or 3-Dimensions. In some embodiments, dimensionality may be reduced to a 3-D space based on one or more principal component analysis (PCA), t-Distributed Stochastic Neighbor Embedding (t-SNE), or uniform manifold approximation and projection (UMAP) analysis techniques. The reduced dimensions may correspond to those dimensions for which properties of the vectors are to be represented in the 2-D or 3-D semantic space and should not be read to suggest that a vector representing a response may not include other appended data elements associated with the response (e.g., creator, distance from other reasons, list of people who prioritized the reason, time stamp, theme classification, etc.).

In some embodiments, the reduction process maintains relative distances between reduced dimensionality vector representation. Thus, for example, the pairwise distance between two reduced dimensionality vectors embedded within the reduced dimensionality space may be proportional to their pairwise distance in high-dimensionality space. The preservation of relative distance may ensure that analyses performed on the reduced dimensionality vectors, such as to infer properties of the semantic space, are valid within the high-dimensionality space without incurring substantial processing overhead.

The process may determine 553 coverage of a sematic space based on the embeddings of vectors representative texts. In the semantic space, vectors may be embedded as a point that is indicative of the respective text (e.g., a word or multiple words in a sentence or phrase of a response). Geometric characteristics of the semantic space may be defined, such as the size and a relative distance matrix. Embeddings of vectors within the semantic space may be indicative of different regions with the semantic space that have been covered by the respective responses. Thus, for example, regions not yet explored, or which are explored less, may be identified.

The process may output results based on the determined coverage, such as indications of what regions of the semantic space are not covered, well covered, or minimally covered. Pairwise distances between vectors within the semantic space may be determined and processed to determine, for a vector, the nearest neighboring vectors. Two vectors having a pairwise distance below a threshold may be determined to have a high shared relevance, or similar to each other. The above and other information about the semantic space may inform a sampling model that may prioritize exploration of outlying regions of the space to assure semantic coverage (e.g., when a new response is received and embedded within a previously unexplored space, such as indicated by large pairwise distances to other vectors). Additionally, such as based on the additional data, like scores for responses based on user feedback, embodiments may determine who shares agreement on which responses within which regions of the semantic space, and a measure of similarity between vectors representative of responses may inform the determination even where each user does not provide feedback on each of those responses.

In some embodiments, the process 500C may be implemented in accordance with the below pseudo-code for a feature set. An evaluation for which responses are received, labeled RC (Reasoning Context) may be defined by a feature set F with elements f. For each fin F, there may be quantitative scores and responses r provided by human or intelligent agents in free form natural language text as support for assessment of elements f. The complete collection of r may be denoted as R, e.g., $r_i \in R$. Embodiments of the process may:

For each $f \in F$
Collect $r_i$
Calculate $r_i$ representation in RC (e.g., high-dimensionality RC where n=768)
Reduce $r_i$ for reduced RC (e.g., low-dimensionality where n=3)
Calculate center of RC
Calculate radius of RC The center of RC may correspond to an origin for anchoring a visualization of the semantic space and the radius of RC may corresponding to that of a volume (e.g., for a sphere) within which the reduced vectors may be displayed in relation to the origin. Thus, in (e.g., 3-Dimension) the RC may have a finite volume and a density based on the number of vectors within the RC. Vectors may be dispersed within the volume relative to the origin based on their respective vectors (e.g., like coordinate of a point), and thus, different regions of the RC may be associated with different densities (e.g., amount of vectors within a region). For example, in some embodiments, a plurality of clusters may be identified based on pairwise distances between vectors. In some examples, a region may be defined around a cluster based on a cluster center, or a collection of cluster centers within a threshold distance, and a radius, or edges of a region, may be based on distances to nearest neighbor centers of regions, or a threshold (e.g., minimum or maximum distance from a center of a region), which in some examples may be a normalized distance based on the dimensions of the RC and an pre-specified or maximum or minimum number of regions that may be formed within the RC based on respective thresholds.

Embodiments may define one or more of a normalized "size" for the RC and a normalized diversity for the RC. For example, a space with small reasoning diversity would have points clustered around the origin.

FIGS. 5A and 5B illustrate visualizations in accordance with the above techniques. For example, a graphical user interface may be presented to a user to show the points in the semantic space along with a numerical value, like a score (e.g., a relevance score), assigned to each point. Reasons that are spatially close to a point may be shown in order of increasing distance. Each point may represent a response received to a stimulus, and the distances between different points may indicate how far apart they are within the semantic space.

A user may interact with the visualization, such as via their user device. For example, the user may select a point to view additional information about the response. For example, the user may select point 87, where 87 may correspond to the relevance score for the response. Selection may cause, such as illustrated in FIG. 5A, the display of additional data with respect to the point. For example, a pane may be generated and display information such as an indication of the user that provided the response which the point represents, the stimulus for which the response was provided, the rating the user provided in association with the response to the stimulus, and the relevancy, or other data described herein.

In some embodiments, in response to the selection, such as illustrated in FIG. 5B, the responses provided for nearest neighing points may be displayed. A pane may display information about the nearest points, such as by displaying the text of the corresponding responses and their distance from the selection point within the semantic space. The displayed distances may be cosine distances (e.g., based on the representative high-dimensionality vectors) or Euclidian distances (e.g., based on the representative reduced-dimensionality vectors).

Infinitely Scalable A/B Testing

A/B tests are commonly used to detect selection preference in eye tests, product features etc. As explained herein, an A/B testing protocol to learn a ranked preference scales exponentially. For example, an A/B testing protocol to test 10 options to learn a ranked preference may take at least 45 A/B pairwise tests to determine a ranked order of the options. Accordingly, empirically testing every option in a set of options including hundreds, thousands or a hundred thousand or more options (or even tens of options in some use cases) under a traditional testing protocol may be practically infeasible.

A traditional A/B testing protocol when scaled may present, at best, a computationally expensive process (and potentially infeasibly expensive process at larger scales, such as for a thousand or more option) for computing systems or existing data sets. Use cases subject to time or latency constraints (e.g., delay between providing a sample pair and receiving a response) may exhibit even further reduction in feasibility as the number of options increases.

Embodiments may employ a probabilistic model to scale an A/B testing protocol (in the traditional sense) for a set of options including tens, hundreds, thousands or a hundred thousand or more options. The probabilistic model may reduce, by orders of magnitude, the number of tests performed to determine a ranked order of the options. Accordingly, example use cases may include determining ranked order among a set of options with reduced computational expense and, for high-latency systems, within a reduced amount of time (e.g., approximately proportional to the reduction in sample-response sessions multiplied by the latency between providing a sample and receiving a response).

Figure 6A:
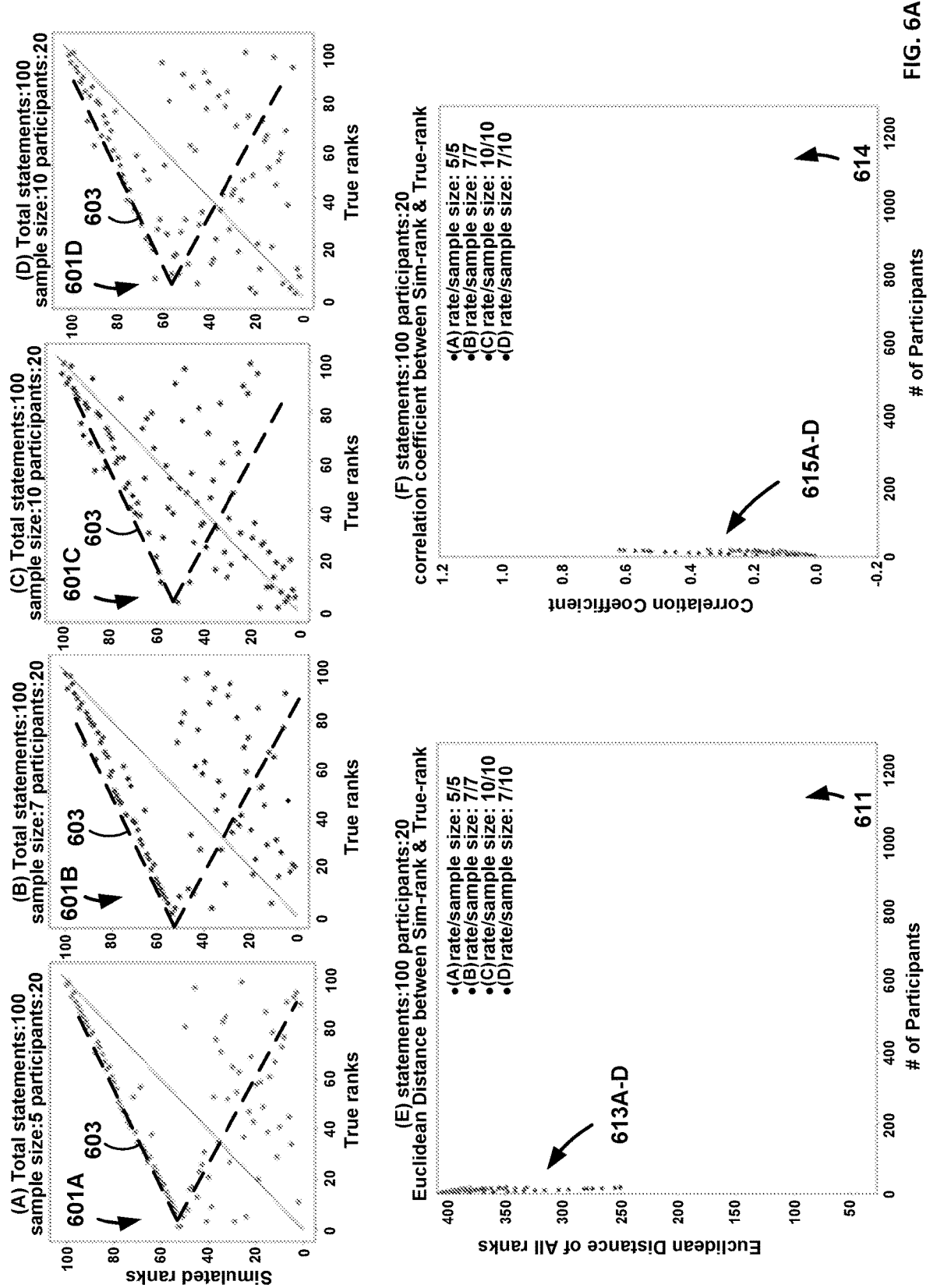
FIG. 6A, FIG. 6B, and FIG. 6C illustrate examples of visualizations corresponding to characteristics of example processes that scale A/B tests, in accordance with some example embodiments.
Figure 6B:
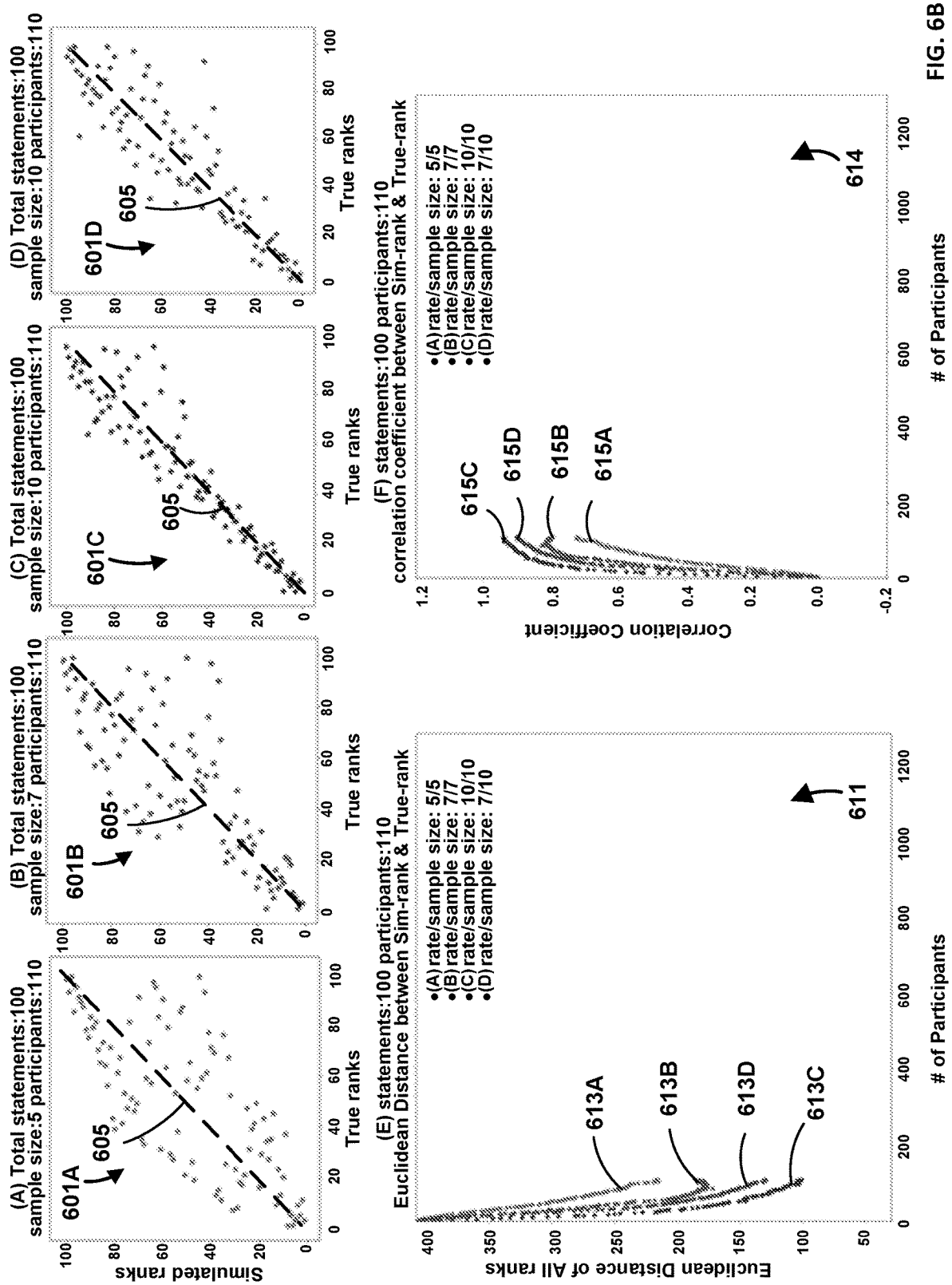
Figure 6C:
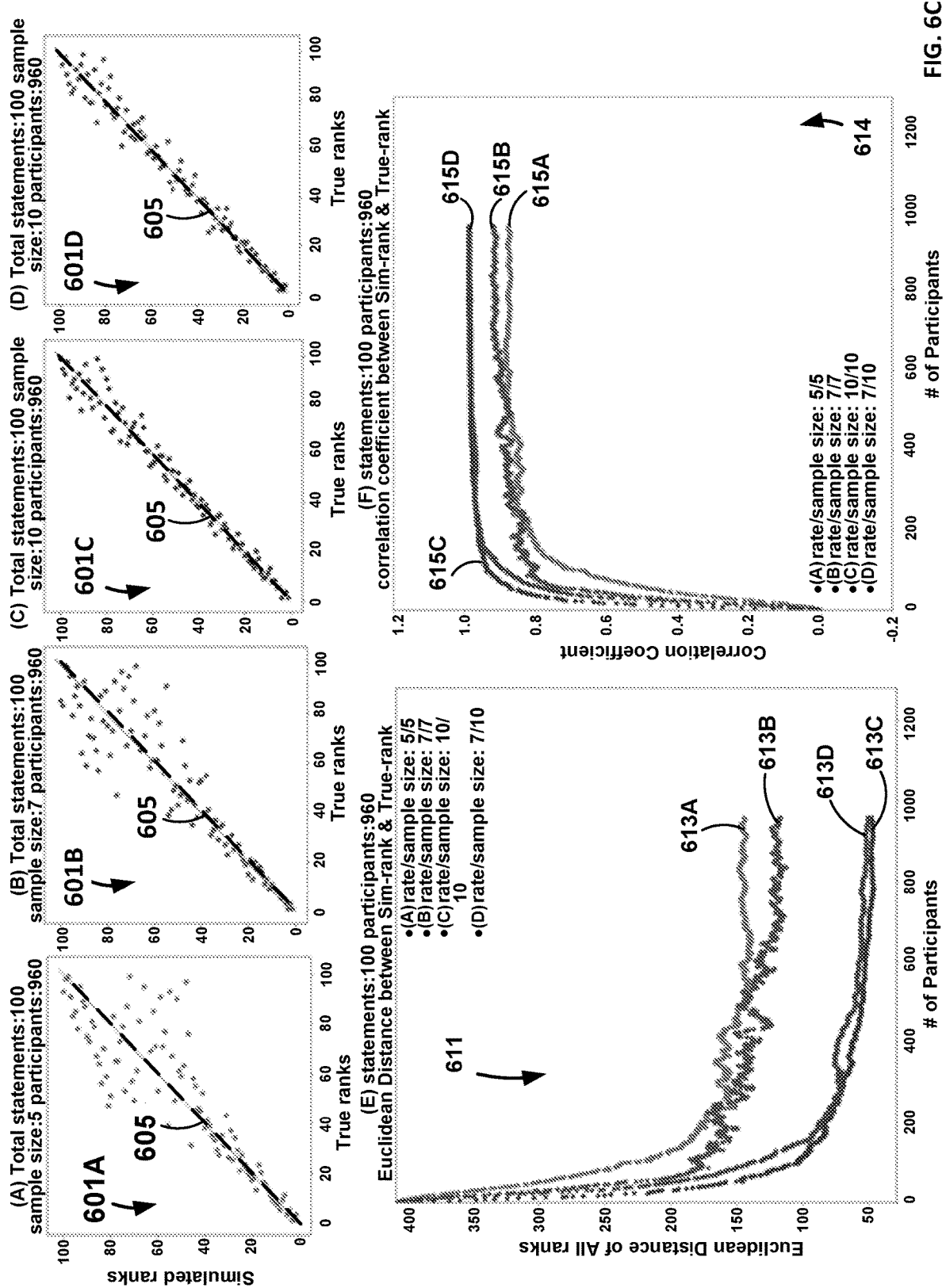
Figure 6D:
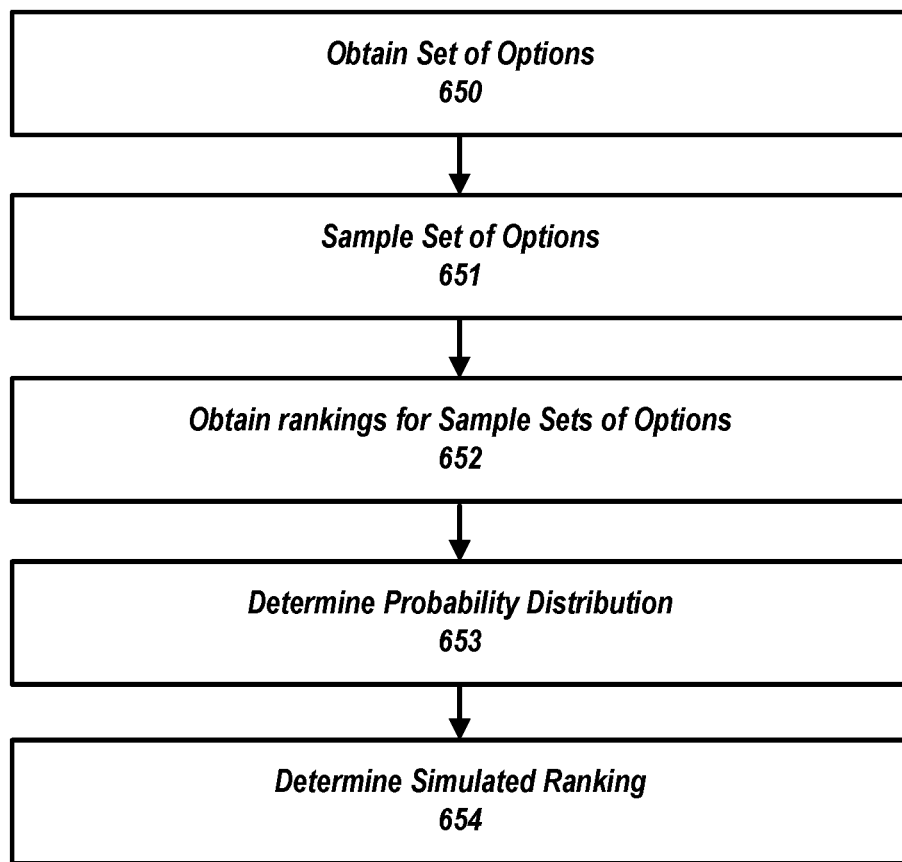
FIG. 6D is a flowchart of an example process for scaling A/B testing, in accordance with some example embodiments.

Embodiments of a process 600, as shown in FIG. 6D, may probabilistically scale an A/B test to determine rank among options in large option sets. For example, the process may include a probabilistic model that is trained to output a probability distribution over a set of options (e.g., of a large, or any size). In many examples, the option list may increase in size over the course of the process, and the process 600 may iterate over an updated option list. For example, in the context of example evaluations described herein, responses (or statements) to an evaluation question may be received over time and added to a set of options among which rank is determined. Thus, new options may be added to the option list at any time.

In some embodiments, the process includes obtaining 650 a set of options for which a ranking of the options is to be determined. As described above, the set of options may be expanded over time, such as by inclusion of a new option. Thus, the step of obtaining 650 a set of options may include obtaining new options and updating the set of options. In some examples, the process 600 may wait at step 650 until a threshold number of options are received for updating the option list. Some examples of the process, however, may obtain a set of options that includes a plurality of seed options for evaluation, which may be updated to include new options over time, or the seed options may be a specific set of options for evaluation that is not updated.

Initially, such as prior to any evaluation of options within the list by ranking entities, all options may have an equal probability of preference. A probability, or probabilities, of preference may be determined based upon evaluations of options within the list that are performed by ranking entities. In order to reduce fatigue (e.g., of human evaluators) or computational expense (e.g., of non-human evaluators), a sample, like a subset, of options may be selected for evaluation by a ranking entity.

FIG. 6A illustrates an example visualization of the process 600 proximate to the beginning of an example evaluation. The points with the plots 601, may correspond to options (in this example, statements) being evaluated, and indicate the simulated ranks (y-axis) and the true ranks (x-axis) of options. At the start, the points may begin along lines 603 indicated in the plots, and as participation begins (e.g., rankings are received), the points indicative of simulated rank may move based on determined probabilities of preference, such as to converge on those for true rankings (e.g., a line where x=y) over time. Plot 611 illustrates a plot of distance between simulated rank and true rank (y-axis) based on number of participants (x-axis), such as ranking entities, for the different conditions 613A-D of respective plots 601A-D, while plot 614 illustrates (e.g., conversely to distance in plot 611) a correlation coefficient between simulated rank and true rank (y-axis) based on the number of participants (x-axis) for the different conditions 615A-D of respective plots 601A-D.

In some embodiments, the process includes selection 651 of a sample set of options to provide to a ranking entity, which may be a human or non-human entity. For example, an entity may be provided with a sample set of (e.g., 5-10) options which the entity ranks in a prioritized fashion, such as most to least, best to worse, etc., or vice versa, like a ranked choice listing of the options within the sample set. The ranking entity may be requested to select and rank options within the provided sample in a prioritized fashion (e.g., as an indication of option priority in an A/B trade off, like a preference of A over B). In other words, the ranking entity may order each option within the sample set according to the entity's ranked choice preference of the options. Embodiments of the process may perform a plurality of selections 651 of sample sets of options to present to a respective plurality of ranking entities (e.g., a ranking entity ranks the options within at least one sample set).

In some embodiments, the process includes obtaining 652 rankings for sample sets of options. For example, the process may obtain, from a ranking entity presented with a sample set of options, the ranking entity's ranked choice among the options within the sample set. Embodiments of the process may obtain a plurality of rankings, such as a ranking for each of a respective plurality of sample sets.

FIG. 6B illustrates an example visualization of the process 600 after at least some participation in an example evaluation, but before a stop condition for the evaluation. The points with the plots 601, which may correspond to options (in this example, statements) being evaluated, and indicate the simulated ranks (y-axis) and the true ranks (x-axis) of options. As shown, after some number of ranking events (e.g., obtained from participants) as participation continues (e.g., increases), the points may begin to converge along a line 605 (e.g., a line where x=y) indicating where simulated rank=true ranking. Plots 601A-D may each correspond to different conditions, and thus may converge at different rates. For example, plot 601A corresponds to a sample selection size of 5 among 100 options, plot 601B to a sample selection size of 7 among 100 options, plot 601C to a sample selection size of 10 among 100 options, and plot 601D to a sample selection size of 10 among 100 options (but, e.g., where only 7 of the 10 may be ranked, whereas in the other examples the rankings make include each option within a sample set). Plots 611 and 614 of FIG. 6B illustrate how the distance (e.g., 613A-D) and correlation coefficient (e.g., 615A-D) between sample rank and true rank change based on number of participants for the respective plot 601A-D conditions described above. As can be seen, a larger sample size may minimize time to convergence, but it is advantageous in many use cases to present a reasonable number of options within a sample rather than every, or most, options for the various reasons described herein.

In some embodiments, the process includes obtaining rankings for a plurality of different sample sets of options from a same ranking entity, such as over time. Some of the sample sets may include newly added options. There may be some crossover between some options selected for the different sets, or there may be no crossover. Some examples of the process may include a sampling model that determines which options to present in the different sample sets, some of which may, or may not, have any crossover of an option with another sample set. In some embodiments, the sampling model may determine whether an option should, or should not, crossover for a selected sample set for an entity.

In some embodiments, the process includes determining 653 a probability distribution over the options, such as based on their performance in obtained rankings of options within the sample sets of options. Thus, for example, a sampling model may select options not yet ranked to sample sets (which is not to suggest that every option need be ranked in every example embodiment, indeed, other techniques described herein may be applied, such as where two options are determined to be similar, to prune an option or associate an option with another option, and thus, one or more options may not be explicitly ranked by ranking entities).

In some embodiments, the process determines, based on the obtained rankings of options within the sample sets of options, a win/loss matrix indicating the wins (or losses) of each option (noting that the number of wins for an option may be zero if it does not win over any other option in rankings for samples including the option) in the options list over one or more options in the options list. Thus, the win/loss matrix may be indicative of a (e.g., relative) performance of options within the option list. The probability distribution may be determined 653 based on the win/loss matrix that encodes a current (but limited) known state of performance of options within the option list. For example, the process may ingest the known state of performance of options within the option list and determine a probabilistic state of performance that estimates relative performance of each option (e.g., based on estimations of option performance against each other option based on its known performance against a subset of the options).

In some embodiments, the process includes determining 654 a simulated ranking among the options within the list of options. The simulated ranking may be based on the estimates of relative performance of each option. For example, the simulated ranking may output an ordered list of options based on their respective performance estimates (e.g., a complete ranking of all options).

The simulated ranking may be referred to as such because every ranking entity need not rank every option, instead relative performance is estimated. The estimations, and thus the output ordered rank of options, may converge on true ranks (e.g., if a traditional A/B testing processes were carried out). Characteristics of sample selection, number of options, number of ranking events, and number of participants (e.g., like a time series of events and properties of an evaluation) may be analyzed to infer information about stopping conditions for the process 600. Specifically, a stopping condition of the process may be informed based on training data records indicative of evaluations by which true ranks were generated (or simulated ranks were validated), and for which the process 600 may be iterated over to simulate ranks during training operations.

FIG. 6C illustrates an example visualization of the process 600 after participation in an example evaluation. The example also illustrates aspects by which assurances of a simulated rank corresponding to a true rank (if an evaluation were carried out beyond a reasonable stop condition) may be guaranteed upon stopping an evaluation based on characteristics of the evaluation. The points with the plots 601, which may correspond to options (in this example, statements) being evaluated, and indicate the simulated ranks (y-axis) and the true ranks (x-axis) of options. As shown, after a number of ranking events (e.g., obtained from participants), the points may tightly converge along a line 605 (e.g., a line where x=y) indicating where simulated rank=true ranking.

Plots 601A-D of FIG. 6C, as shown, may each correspond to different conditions and may converge at different rates. Thus, for example, conditions or characteristics of an evaluation may be analyzed to determining a stopping condition (e.g., after a threshold number of ranking events). For example, plot 601A corresponds to a sample selection size of 5 among 100 options, plot 601B to a sample selection size of 7 among 100 options, plot 601C to a sample selection size of 10 among 100 options, and plot 601D to a sample selection size of 10 among 100 options (but, e.g., where only 7 of the 10 may be ranked, whereas in the other examples the rankings make include each option within a sample set).

Plots 611 and 614 of FIG. 6C illustrate how the distance (e.g., 613A-D) and correlation coefficient (e.g., 615A-D) between sample rank and true rank change based on number of participants for the respective plot 601A-D conditions described above. As can be seen, a larger sample size may minimize time to convergence, but it is advantageous in many use cases to present a reasonable number of options within a sample rather than every, or most, options for the various reasons described herein. Additionally, as can be seen, as the number of participants increases (and thus a number of guaranteed ranking events, which is only an illustrative example as in some example embodiments disclosed herein a single participant may rank multiple different samples over time) the distance between determined rank and true rank may be minimized (e.g., correlation increases). The example plots, however, illustrate that characteristics of an evaluation may inform a stopping condition based on, for example, a number of obtained ranking events for the evaluation and that stopping condition may correspond to an assurance threshold (e.g., a threshold level of minimization of distance or maximization of correlation coefficient) in accordance with the techniques described herein.

Probabilistic Graphical Networks

Some embodiments an expert system may generate a graph based on results or determinations corresponds one or more processes described herein. In some examples, the graph may be a probabilistic graphical network (PGN), such as an acyclic graph comprising edges and nodes. A node may correspond to an informational component processed during, or associated with, an evaluation and an edge, such as from one node to another node, may be indicative of an association between the different nodes.

In some examples, such as for an evaluation for which features are structured (e.g., either in a structured evaluation or determined from unstructured data and provided for evaluation) the probabilistic graphical network may graph inputs of a machine learning model (or one or more thereof) and outputs of the machine learning model (or one or more thereof) as graphical elements, where one or more edges or nodes, or values associated therewith, may be based on the outputs. For example, as a set of ranking entities engage an expert system during an evaluation, the expert system may determine and update a probabilistic graphical network that represents a state of the evaluation (e.g., at a point in time after one or more ranking events), or (e.g., after completion) a final state and determined scores based the inputs provided by the ranking entities. In some embodiments, the expert system may execute examples processes to determine a PGN as a function of time, as the inputs from the set of ranking entities and thus the outputs of the machine learning model(s) may evolve over time, and the different point-in-time results reflected by the graphs may be indicative of a trajectory of how a set of ranking entities (or different subsets of entities) as indicated by the model outputs aligned (or did not align) in with regards to a feature and response associated therewith over time.

Figure 7:
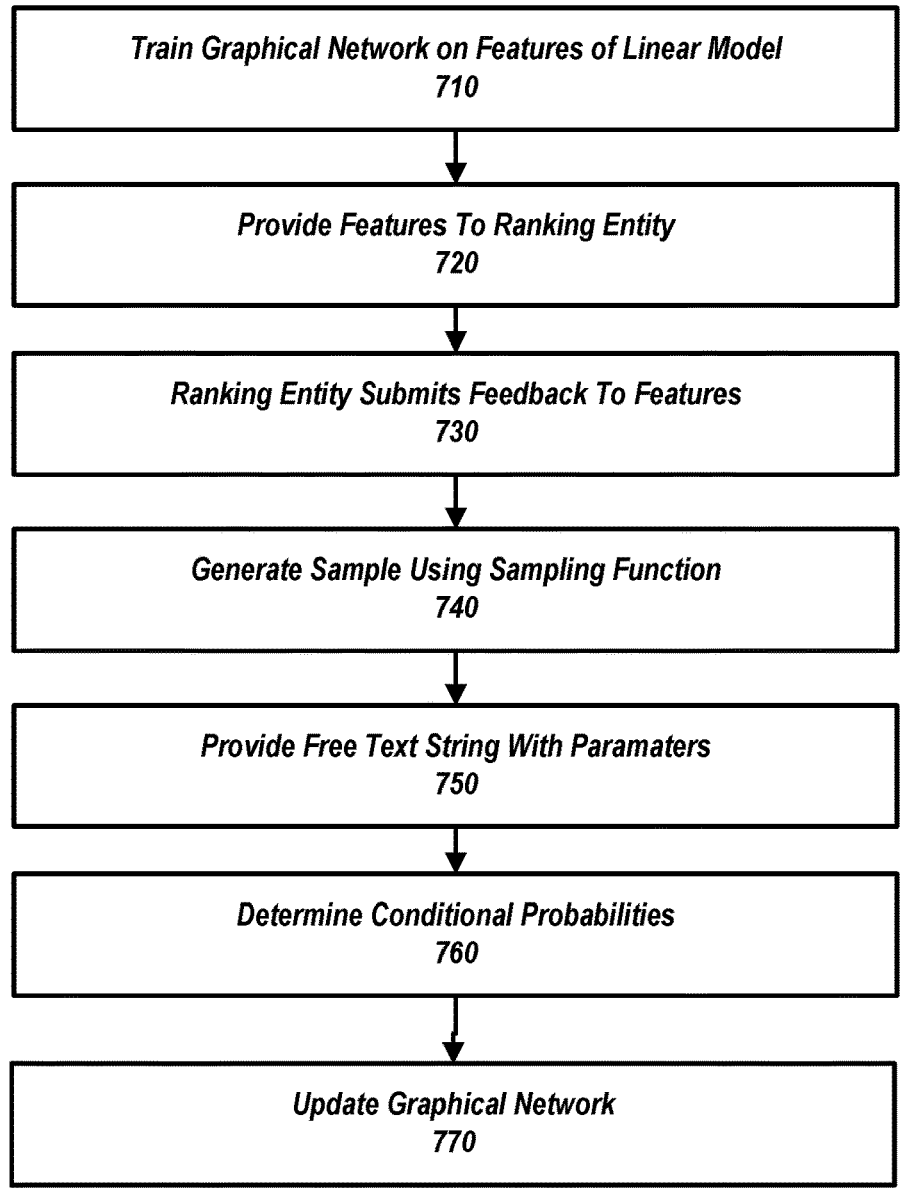
FIG. 7 is a flowchart of an example process for generating a graphical representation of a probabilistic network, such as a probabilistic Bayesian network, in accordance with some example embodiments.

FIG. 7 is a flowchart of an example process 700 for generating a graphical representation of a probabilistic network, such as a probabilistic Bayesian network, in accordance with some example embodiments. Embodiments of the process 700 may determine a probabilistic graphical network that maps and condenses inputs to machine learning models and outputs of the machine learning models, such as a PGN, which in some examples may be a Bayesian belief network (BBN), in accordance with one or more of the techniques described herein. The process may include determining a probability distribution over the list of options and a complete ranking of all options, based on their determined (e.g., estimated) performance in in A/B tests based on ranked orders of subsets of options by different ranking entities. To generate a PGN, the process may receive as input, features based on a linear model comprising of a set of features ($F_1$ to $F_n$) for evaluation, where for each $F_i$, at least some ranking entities submit a score and response. The process may generate a sample using the sampling function β and uses free text strings with a set of proprietary parameters (relevance, link to a score). A machine learning model may generate conditional probability tables for each F, mapping a response to probable scores. Conditional probability tables may be generated, linking score to probable model outcomes.

In some embodiments, the process includes training a PGN (such as a BBN) on features 710 for evaluation by a linear model. In some example embodiments, the features may be evaluation questions that are presented to ranking entities. The linear model may assign a weight to each feature, where the weights may vary in value for each feature. In some example embodiments, the weights are updated based on outputs (e.g., scores, distances, or other metrics) represented within the PGN for the features over time, such as outputs of results determined by techniques like those described above and elsewhere herein. The weights as determined for a given feature may scale the importance of a feature relative to other features to which ranking entities may provide a response (or responses). The number of features that the linear model receives may be 1, 5, 10, 100, or 1000 or more. The number of weights in the model may be equal to the number of features, or the number of weights may be greater or less than the number of features. The weights of the linear model may be a constant throughout time determined from a machine learning model, or the weights may be functions of time. The weights may take the form of a vector, where each component of the vector may be a function of time, and each component may depend on time differently from the other vector components. The time-dependent functional form of the weights may be linear, exponential, periodic, transcendental, logarithmic, or any combination of these. One or more weights may also be set to zero after a period of time to indicate that the feature associated with those weights is no longer relevant after the period of time has passed. In some examples, a period of time as referenced may be based on other metrics, such as number of participants or rating events in relation to an evaluation, and thus need not be a fixed time period in every case, or even temporal in nature, but rather indicative of a point in an ordered series of events, though in many examples such as those discussed herein, the series of events may be a time series of events.

The features provided to the linear model may be evaluation questions to which a ranking entity may provide feedback (e.g., score or provide a response or both). A value associated with a feature may be determined before a ranking entity submits feedback to the feature, or the value of a feature may depend in part on a received input associated with the feature. The linear model may be normalized by the weights, such that the output value of the model ranges from 0 to 1.

In some embodiments, the process includes providing features to a ranking entity 720. In some embodiments, the features may be presented to a user (e.g., acting as a ranking entity) via a graphical user interface on a user device. The features may be provided as graphical blocks that the ranking entity responds to in relation to their graphical representation within the interface, or the features may be provided with open text boxes capable of receiving textual input. The features may be presented with a numerical scale that the ranking entity can interact with to assign a score. The features may also be presented such that there is both an open text box and a numerical scale. The features may be presented with two input regions, one for an input that receives texts and one that receives numerical input. The features may be presented to a ranking entity in rows and columns, where the ranking entity can choose features for which they wish to provide feedback. In some embodiments, the features may be presented to a non-human agent, such as in an encoded form, which the non-human agent may process to select a score or otherwise provide a response. In either instance, the users or non-human agents may be ranking entities which provide feedback in relation to one or more features and may subsequently rank or score feedback provided by other ranking entities.

In some embodiments, the process includes ranking entities providing feedback to the features 730. The ranking entities may provide feedback in the form of an unstructured response or a score. In the case that the ranking entity provides feedback to the feature in the form of an unstructured response, the system may use a machine learning model (e.g., natural language processing model) to convert the unstructured response into a constant or a vector. If the ranking entity feedback is a score, the score may relate to a categorization of agreeance to the entity. For example, the feedback score may take a value in the range of 1 to 10, where a value of 1 indicated highest value of agreeance to the ranking entity and a value of 10 may indicated lowest value of agreeance to the ranking entity, or the score may take a value in the range from 1 to 100, where 100 indicates highest value of agreeance and 1 indicates lowest value of agreeance. The ranking entity may submit feedback for the score in the form a verbal statement, for example, the ranking entity may indicate how well the agree with a feature (e.g., "completely agree," "slightly agree," "no opinion," "slightly disagree," or "completely disagree"). Once the ranking entity indicates their selection, a score may be generated by their feedback (e.g., "completely disagree" is equated to a 1 and "completely agree" is equated to 5). The ranking entity feedback may take the form of a binary selection, for example, the ranking entity may indicate "yes" or "no," "true" or "false,' 1 or 0, an icon of a thumbs up or a thumbs down, a red button or a green button. The binary selection may then be converted into a score. Once the ranking entities have submitted feedback to the features of the model, the scores and responses may be processed by one or more models to determine nodes or edges and associated values within the PGN. In some embodiments, only the responses provided by the ranking entities may be used. In some embodiments, multiple PGNs based on respective subsets of the above information. For example, a first PGN may be representative of response relevance and a second PGN may be representative of rank entity engagement/influence, as discussed below.

In some embodiments, the process includes generating a sample of feedback received for a feature by a sampling function 740, as described above. The sample may include a subset of feedback, like responses submitted by one or more ranking entities, that are provided to other ranking entities. Once the sample has been generated, the process provides free text strings with parameters 750 to the PGN. The parameters may include the ranking entity relevance assigned to the features and a link to the score that the ranking entity provided as part of the feedback to the feature. The free text strings may be analyzed via a NLP model to determine a theme associated with the feedback (e.g., a natural language text response). A theme may be determined based of the relevance associated with the feedback or based on the linking to the scores. In some embodiments, a theme is associated with a subset of responses based on theme classification scores output by the NLP model, such as based on a threshold score for classification of a theme for a response. Some themes may also have a relevance score associated therewith, such as based on the relevance of the theme to the feature or stimuli. In some examples, relevance of a theme is determined as the mean value of the relevance scores for all the responses that are associated with the subset of responses associated with the theme. In some examples, the score is based on an inference from the scoring pattern associated with the scores attached to each response associated with the theme. For example, the theme may be inferred based on a distance score that is linked to each response in the subset, the values of the distances being below a threshold distance to form a cluster and the theme determined from the subset of responses identified to the cluster (or vice versa). It is important to note that themes as described herein are not mutually exclusive, meaning that the elements in the subset of responses associated with the theme may also be associated with other themes. In some embodiments, one or more themes may be mapped in the PGN to a feature based on a context (or evaluation frame).

In some embodiments, a listing of potential theme classifications may be determined for a context based on classifications output by an NLP model for natural language tests associated with the context (e.g., evaluation frame), such as the stimuli or features being evaluated for the context.

In some embodiments, the process determines conditional probabilities 760 by which informational components are related. For example, conditional probabilities may relate responses and themes by which relevance scores or ranks may be determined or ranking entities by which engagement or influence scores or ranks may be determined, such as by constructing one or more matrixes, and determining conditional probability tables based on the matrixes.

In some examples, one or more nodes of a PGN may correspond to responses, and edges between the different nodes may be indicative of associations between the responses. In some examples, one or more nodes may correspond to an identified theme (e.g., for one or more responses), an evaluation question or stimulus for which a response is received, or other information component described herein. In some examples, the edges may be directed, such as a pointer in a directed acyclic graph, and indicative of a direction of the association (e.g., a plurality of pointers may point from a stimulus to evaluation questions for the stimulus, another plurality of pointers may point from an evaluation question to responses submitted in association with the evaluation question, and another one or more pointers may point from a response to other related responses (e.g., based on determined relevance) or to an identified theme (e.g., based on determined relevance) or vice versa). Distances, or scores, may be associated with the edges (or pointer or other data structure indicative of an association between nodes, and in some examples a direction, which is not to suggest that a data structure by which an edge (or nodes) are encoded cannot indicate these and other metrics).

For example, as described above, each ranking event in the discrete series may occur at a time $t_i \in T$. A tensor H modeling of the context may include vectors corresponding to respective responses, and values of a vector may correspond to properties of the responses, such as semantic distances, rankings, or other properties. For example, the elements of tensor H may be vectors for each response that define relevance with respect to other responses and a measure of semantic distance from other responses (e.g., based on distances between outputs of a NLP model for respective natural language texts), and the matrix form of H may be structured based on wins, semantic distance, and relevance probability for each h. In some embodiments, a relevance distribution (e.g., R) is determined based on vectors corresponding to ranking events, such as by determining an adjacency matrix. The adjacency matrix may be converted to a transition matrix by normalizing the matrix into a probability matrix. For example, by applying the matrix power law, the largest eigenvalue/eigenvector may be computed:

$$R_{t+1} = TR$$

where determined result, e.g., $R_{t+1}$ after a rating event R, may correspond to a probability distribution of responses in the sense that the values of, for example, eigen vectors are indicative of rank ordered probabilities of relevance based on the ranking events. Embodiments of processes described herein may generate a PGN based on, or indicative of information like that described above, which may be processed to update the PGN.

In some embodiments, a conditional probability table may be determined from the probability of a selected theme given the probability of the responses within the subset that makes the theme. A conditional probability table may map the responses for the features of the linear model to a probable score. In some embodiments, the process may include determining a probable outcome for the model, the PGN takes the probability of the responses (associated with their individual relevance) along with the probability of the themes that the responses belong to, where the probability of the themes is conditional on the responses. The PGN may link the responses and themes based on the conditional probability tables to probable model outcomes 770, without needing to take an empirically derived result as input. The may PGN automatically determine an outcome probability, conditional on the collective reasoning, using the probabilities of the reasonings, the probabilities of themes conditional on the reasonings in the subset that makes the themes, and the probability of the features conditional on the themes. Thus, the probability of the outcome for the collective reasonings considers the features of the linear model in a manner based on the relevance of the feedback provided by the ranking entities, which may be captured by the themes and contexts. The functional form of the outcome probability may be given as:

$$P(\text{Outcome} \mid \text{CollectiveReasoning}) = P(\text{Outcome} \mid EQ_1, EQ_2, \ldots EQ_l)$$

$$\prod_{k}^{l} P(EQ_k \mid \text{Theme}_{EQ_k}) \prod_{i=1}^{m} P(\text{Theme}_i \mid \text{Reason}_{\text{Theme}_i}) \sum_{j=1}^{n} P(\text{Reason}_j)$$

In some examples, one or more nodes of a PGN may correspond to participants (e.g., users or ranking entities), and edges between the different node may be indicative of associations between the different participants. For example, a participant may be associated with one or more responses provided by the participant, and as explained herein, other participants may rank or score those responses. An edge between nodes, which in some examples may be a directed pointer, may indicate an instance in which one participant rated a response provided by another participant, and the direction of the pointer may indicate that participant A ranked or scored a response of participant B (and not the reverse, which is not to suggest that another pointer may not be directed from a node corresponding participant B to participant A if participant B ranked or scored a response of participant A, or that a data structure by which an edge (or nodes) are encoded cannot indicate these and other metrics).

In some embodiments, given an evaluation process a and a group of ranking entities (or participants) M, a network of interactions may be modeled as a Markov process that converges to a stationary distribution of influence P(m) where mi is the influence of relevance $M_i$. The Markov model associated with N (outbound links) may be processed to determine an Engage Rank (E), which is a measurement of engagement in reviewing and ranking of responses submitted by, and evaluated by, ranking entities. As described above, a link, like an edge, which may be a directed pointer, may be inbound to a node corresponding to a given ranking entity and formed from another ranking entity to the given ranking entity based on another ranking entity submitting a rank (or score) in association with a response submitted by the given ranking entity. An adjacency matrix may be determined from inbound links and normalized to a transition matrix:

$$M_{\omega-1} = TM_\omega$$

where $M_\omega$ is the stationary distribution of influence. An inbound link occurs whenever member $m_i$ rates $m_j$. An outbound link occurs whenever member $m_i$ is rated by $m_j$. In some embodiments, a network model of the process may be determined based on both inbound and outbound links. Thus, for example, engagement or influence rank of a given ranking entity may be reflexive based on the engagement or influence rank of other ranking entities that rank responses submitted by the given ranking entity (e.g., in addition to, instead of, or comingled with as a weighted sum of rank or score of the responses). In some embodiments, the edges associated with a node may be represented as vectors to determine a matrix (e.g., like a win/loss matrix), from which an adjacency matrix A may be determined. The adjacency matrix A, may, for example, be of the form:

$$\begin{array}{c c} & \begin{array}{c c c c c} M1 & M2 & M3 & M4 & M5 \end{array} \\ \begin{array}{c} M1 \\ M2 \\ M3 \\ M4 \\ M5 \end{array} & \begin{bmatrix} 0 & 1 & 0 & 1 & 0 \\ 1 & 0 & 1 & 0 & 1 \\ 1 & 1 & 0 & 0 & 0 \\ 1 & 0 & 0 & 0 & 1 \\ 1 & 0 & 0 & 0 & 0 \end{bmatrix} \end{array}$$

where outbound links correspond to the ones along any given row and the inbound links correspond to the ones along any given column. Elements of the adjacency matrix that satisfy a condition (row,column)=($m_i$, $m_i$) may be set equal to zero (e.g., influence of a ranking entity for itself may be defaulted to zero).

Here, the adjacency matrix A may be processed, such as by application of the matrix power low, to determine an eigenvalue/eigenvector with respect to the different ranking entities, and thus a ranked order and influence or engagement metric thereof (e.g., similar to that of relevance for responses). In some embodiments, the determined eigenvalues/eigenvectors may be normalized, such as on a corresponding scale, like 1-10 or 1-100, by which influence or engagement metrics may be displayed in association with respective rating entities (and in some examples, distances and edges between nodes corresponding to rating entities may be displayed in a graph based on example metrics like those described above).

In some embodiments, different matrices are constructed based on different factors. For example, in some embodiments, an adjacency matrix indicative of engagement may be based on a count of outbound links corresponding to a ranking entity. As noted above, outbound links may be formed based on interaction of the entity with informational components, and thus a count may be indicative of a quantitative measurement of how many informational components the entity interacted with based on the PGN. In another example, an adjacency matrix indicative of influence may be based on rankings associated with interactions, such as how high an entity's responses were ranked relative to the responses of other entities. Additionally, rankings of responses of other entities by an entity may be weighted based on other entities rankings of the responses of the entity. Thus, for example, a rank of a response by an entity having highly ranked responses (e.g., corresponding to a high influence score) may be weighted higher than a rank of the response by another entity having low ranked responses (e.g., corresponding to a low influence score). In other words, entities determined to have a higher degree of influence may boost (or reduce) influence potential of another entity (and thus the responses provided by that entity). In some examples, a sampling function may reduce or increase a priority for selecting an option to a sample set for ranking entities based on the above, among other factors.

In some embodiments, a conditional probability table may be determined 760 based on the engagement and influence scores or ranks. A conditional probability table may map the responses for the features of the linear model to their respective entities and a probable influence of each entity on the evaluation, such as based on how often and how well responses of an entity were ranked or scored by other entities. In some embodiments, the process may include determining a probable outcome for the model based on the presence or absence of a ranking entity, e.g., as distribution of probable outcomes with or without engagement of the entity as a measure of influence. Embodiments of processes described herein may generate a PGN based on, or indicative of information like that described above, which may be processed to update 770 the PGN.

Examples of probabilistic graphical networks may map, such as in a graph, which in some embodiments may be processed for display by a visualization system, information about an evaluation like that described above based on the encoding of nodes and relationships, or edges, between nodes. The graph may display results determined based on the responses provided for different features (e.g., evaluation requests, stimuli, etc.) of an evaluation, or other information about the evaluation process (e.g., how rating entities participated in the evaluation and upon information submitted by other rating entities).

In some embodiments, responses received and ranked by ranking entities may be processed to determine a single output score of a PGN that represents a measurement of alignment among the ranking entities for different features of an evaluation. A PGN may be updated 770 based on the evolution of the conductional probabilities associated responses and rankings thereof for a time series of ranking events. For example, as multiple ranking entities are provided with a set of features, the ranking entities may provide feedback to the features. Embodiments may determine a score indicative of how closely a set of ranking entities (or different subsets of ranking entities) align with one another and determine a quantitative score of a feature based on the inputs (e.g., responses and feedback) from the various ranking entities with respect to the feature, processes by which a probabilistic graphical network are determined may condense the inputs and results of processing those inputs into a single output score.

In some embodiments, a score, such as for a feature or stimuli, may calculated based on a linear model that takes evaluation questions $EQ_i$ and weights wi as inputs:

$$Score = \sum_{i=1}^{n} w_i EQ_i$$

where the weights may be based on metrics like those described above, such as relevance and alignment of a set of ranking entities or subsets of ranking entities (and their respective sizes) for a feature or stimuli. In some embodiments, the above noted feature scores, may be subscores, such as component scores of a combined score based on each evaluation question across a plurality of features or stimuli.

In some embodiments, a PGN may be used to visually interrogate and improve time to decision performance and accuracy in a wide variety of categories. For example, in some examples, the expert system may, based on a PGN, audit noise and effects thereof in accordance with technique described below. Further, given a data set, the system can gather data on evaluations and collective reasoning of the ranking entities to compare predictive accuracy to trackable outcomes. Specifically, the system may have a time series data set indicative of the actions of the ranking entities that lead to a specific score and prediction. The system may use a logistic regression classifier with training data based on tracking the variable or follow-on outcome to update parameters of the machine learning model. The system may also use an approximate causal model of the collective reasoning of the ranking entities in the form of a PGN (which in some examples may be a BBN) available for simulation, testing, and analysis. These capabilities enable analysis of bias, noise, and creative evolution of ideas resulting from the interactive evaluation process.

Thus, in some embodiments, probabilistic graphical models (e.g., PGN, such as a BBN) are acquired from structured dialogue with collections of participants (e.g., experts). Given a stimulus and an open-ended question, various probability distributions are produced, including a probability distribution P(r) of response relevance to the collection of participants, a probability distribution P(m) of influence of the participants in the collective model, a probability distribution P(e) of engagement, and a joint probability distribution P(Outcome|α) that represents the predictions of the participants conditional on the results of a knowledge discovery process.

Measurements and Visualizations to Diagnose Sources of Noise and Measure the Free Energy in an Evaluation based on Probabilistic Graphical Networks As described herein, modeling techniques may include the generation of a probabilistic graphical network (PGN) based on the processing of information corresponding to an evaluation, some examples of which may indicate a predictive outcome (e.g., a score for a given inquiry) based on the state of information on which the PGN is based. In some examples, a PGN is generated based on information specific to a given inquiry, and in some examples, subgraphs of the PGN may correspond to a subset of information for the given inquiry, such as for a component (e.g., evaluation questions or feature) or subset of components (e.g., set of evaluation questions or features for a given stimuli) of the given inquiry. Accordingly, in some embodiments, a PGN (e.g., $PGN_x$), which may be a subgraph of a PGN, may correspond to some feature (or evaluation question or stimuli) X. $PGN_x$, which may be a BBN, may encode a mapping of that ranking entity's feedback and that of other ranking entities.

Figure 8A:
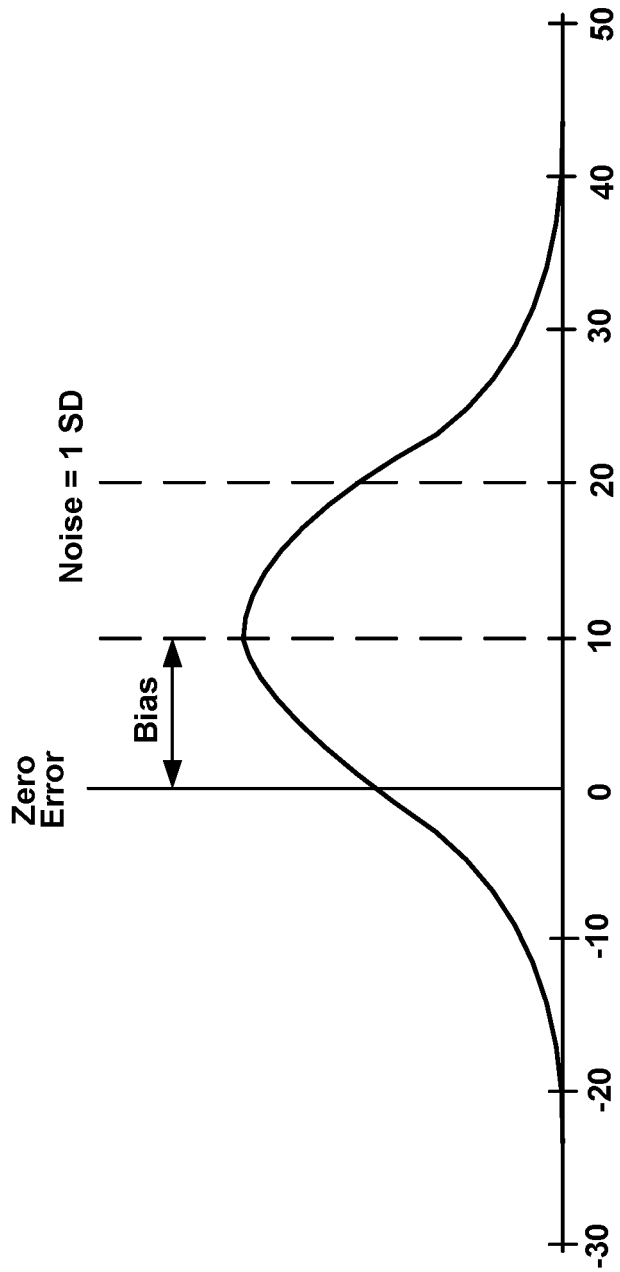
FIG. 8A illustrates an example of a distribution curve based on a probabilistic graphical network and noise measurements for a result being audited, in accordance with some embodiments.

In some embodiments, the feedback of a given ranking entity may be indicative of that ranking entity's prediction, evaluation, or other scoring metric for feature X in an evaluation. For example, each ranking entity having provided feedback (e.g., scores, responses, rankings of responses provided as feedback by other entities) may be treated by a process as a Bayesian learner, where a result of processing feedback associated with the entity represented in the PGN is selected as a posterior prediction (e.g., based on that entity's feedback for the feature). The results determined for respective entities may be plotted to determine a distribution of the posterior predictions, like a distribution curve (e.g., a Kahneman noise distribution curve), which may be audited relative to a result (e.g., occurring at a later time) to determine one or more metrics indicative of noise in feedback received from the entities. In some embodiments, a relevance probability distribution of responses and scores provides an explanatory diagnostic, where the PGN provides a causal model for determining the noise distribution curve. FIG. 8A, for example, illustrates an example of a distribution curve based on a probabilistic graphical network and noise measurements for a result being audited, in accordance with some embodiments. The distribution curve may be determined based on a distribution of posterior predictions of entities in accordance with a process like that described below to score ranking entity bias and noisiness of ranking entity feedback.

Figure 8B:
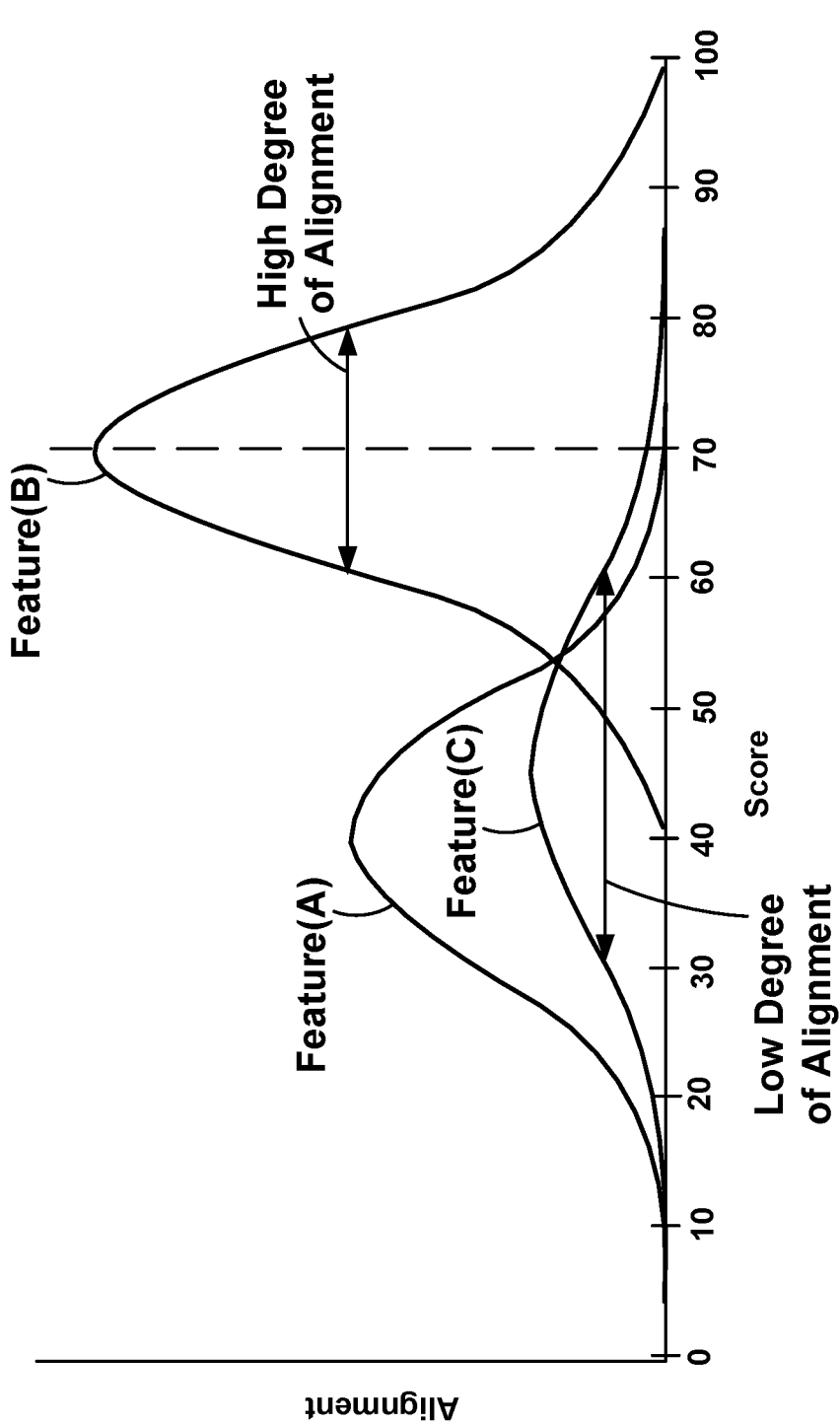
FIG. 8B illustrates examples of distribution curves for different features based on a probabilistic graphical network and alignment measurements, in accordance with some embodiments.

Distributions based on the above or other metrics encoded within a PGN may be indicative, such as for a plurality of different features, whether entities tightly or loosely align in their scoring of the respective features. In some examples, each ranking entity having provided feedback (e.g., scores, responses, rankings of responses provided as feedback by other entities) for a feature may be assigned an alignment score based the respective feedback indicated by the PGN. An alignment score of the entity may be determined for a plurality of features based on the respective feedback for the features. For a set of alignment scores determined for respective entities for a given feature, a distribution of the alignment scores may be determined. Properties of an alignment distribution for a given feature may be indicative of alignment of the entities around a given score indicative of alignment of the entities. FIG. 8B, for example, illustrates examples of distribution curves for different features based on a probabilistic graphical network and alignment measurements, in accordance with some embodiments. Each distribution curve may be determined based on a distribution of entity alignment scores in accordance with a process like that described below to score ranking entity alignment (e.g., agreement, or lack thereof) for a respective feature.

Figure 9:
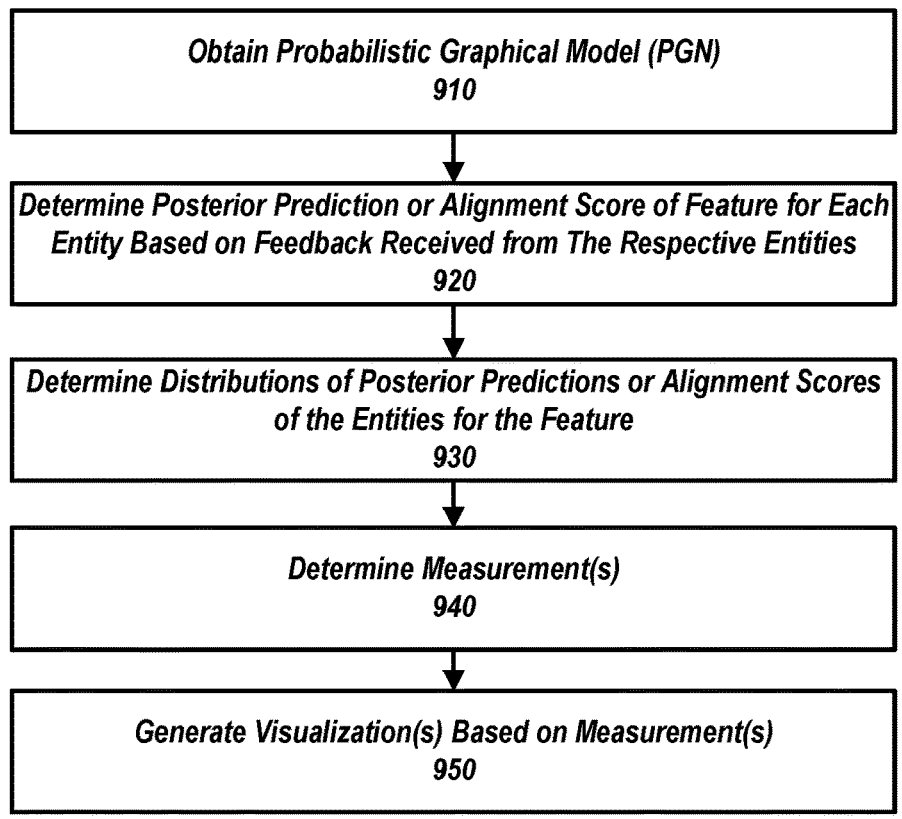
FIG. 9 is a flowchart of an example process for determining measurements based on distributions determined based on a probabilistic graphical network, in accordance with some example embodiments.

FIG. 9 is a flowchart of an example process 900 for determining measurements based on distributions determined based on a probabilistic graphical network, in accordance with some example embodiments. Embodiments of the process may obtain 910 a probabilistic graphical model (PGN) or data by which a PGN may be generated and generate the PGN. In either case, the PGN may be based on a time series data set corresponding to an evaluation process. For a given feature of the evaluation process, the PGN may indicate a subset of the time series data set by which a prediction or score of an entity with regard to the feature may be inferred (e.g., individually for the entity). For example, if the feature corresponds to data interrogation latency, participating entities may provide feedback indicative of whether a latency metric meets, exceeds, or does not satisfy system needs. The PGN may be processed to determine whether the participating entities align around a given result, which in some examples may be considered representative of a prediction.

In some embodiments, the process may determine 920 a posterior prediction of each entity based on feedback received from the respective entities. For example, in some embodiments, the process may determine a result for one or more features represented in the PGN. Considering the above example, the process may monitor performance of a system, such as query response times, and obtain performance data indicative of whether data interrogation latency exceeds a threshold that bottlenecks system performance for generating responses to queries. Performance of data corresponding to other systems may also be obtained, along with other data, like a projected number of queries or other relevant metrics. Embodiments of the process may train a machine learning model, which in some examples may include or be a logistic regression classifier, with training data based on performance data of obtained results and other performance data, such as to determine whether data interrogation latency of the system does not satisfy, meets, or exceeds current or projected threshold performance requirements or benchmarks as indicated within the training data. Feedback of an entity that is mapped in the PGN may be processed to determine a prediction of the entity for the feature. The entity may be treated as a Bayesian learner to determine a corresponding posterior prediction based on their evaluation of the evidence, e.g., how the entity scored a feature, which in the example context may be how the entity scored the latency metric as meeting, exceeding, or not satisfying system requirements, and how the entity ranked responses (e.g., reasons provided by other entities for their scores) associated with respective scores for the feature. The entity's evaluation of the feature may be scored based on feedback data, like that described above, collected from the entity and represented within the PGN, such as on a scale of 1-10 or 1-100, which may correspond to a scale for which the entity indicated their score for the feature. In some embodiments, the score corresponding to the entity's prediction is a weighted sum based on the score for the feature and the scores of ranked ordered responses evaluated by the entity for the feature.

In some embodiments, the process determines 930 a distribution of posterior predictions of participating entities. For example, a prediction score of each entity may be determined based on the feedback data associated with the respective entity as described above. The process may determine a distribution of the scores as being representative of the collection of posterior predictions of the participating entities.

In some embodiments, the process determines 940 one or more noise measurements based on the distribution of posterior predictions and a classification of the determined (or obtained) performance data for the feature (e.g., a classification output by the machine learning model). FIG. 8A, for example, illustrates an example plot including a distribution and noise measurement in an evaluation in accordance with the above techniques. FIG. 8A also illustrates an example of a result, e.g., zero error, relative to which a peak of a distribution of the predications may be located, like a distance. For example, in the context of the above example of data interrogation latency, the zero error may correspond to a result of data interrogation latency impact on system performance translated to the scale by the process, e.g., like a degree to which data interrogation latency exceeds or does not exceed performance benchmarks. In some examples, the result may be normalized to the scale (or a corresponding scale) by which participating entities scored the feature. In some examples, a corresponding scale may be learned by a machine learning model during training of the machine learning model based on benchmark data and corresponding classifications. In some examples, the scale may be normalized to the context within which the entities scored the feature (e.g., 1-10, 1-100, yes-no-maybe, etc.) Thus, for example, the machine learning model may output a determined score or location on a scale (and optionally a scaling) for a classification of the obtained performance data or observed results corresponding to the feature. A distribution may be analyzed relative to the output based on the normalized scale that contextualizes the observed result (e.g., location thereof) and distribution (e.g., location of peak thereof and width, such as based on the standard deviation of the distribution). The distance between the peak of the distribution of predictions and the zero error (e.g., observed result) may indicate a bias of the participating entities. For example, considering the above example, and in reference to FIG. 8A, the peak of the distribution may be considered to correspond to a bias of the entities in evaluating system performance with respect to data interrogation latency, e.g., overly optimistic or overly pessimistic. A standard deviation of the distribution, such as that distal to the zero error (observed result), may be indicative of a number or percentage of participating entities whose predictions were furthest from the observed result, and thus how much noise those entities imparted into the evaluation. Additionally, the contextualized location of the observed result and the distribution may be indicative of the percentage or count of participating entities having more closely predicted the result. The width, e.g., distance to 1SD from the peak of the distribution, and the bias distance, may thus influence the count or percentage of participating entities determined to closely predict (or not predict) the resulting outcome. Some embodiments may classify one or more of the entities, a percentage of entities, or count of entities based on the above measurements.

In some embodiments, the process generates 950 a visualization indicative of one or more of the measurements determined above, such as shown in FIG. 8A. The visualization and noise metric scores (e.g., bias, counts or percentages of entities having closely predicted (or that did not closely predict) an output) may be generated and displayed in correspondence to the feature that was evaluated and the observed result. For example, in some embodiments, the process may generate a plot based on the contextualized scaling and the relative locations of the observed result (e.g., based on machine learning classification) and the distribution of posterior predictions for the feature.

In some embodiments, the process may determine 920 an alignment score of each entity for a feature based on feedback received from the respective entities for the feature. In some embodiments, an alignment score may correspond to a posterior prediction or based on a posterior prediction. In some examples, an alignment score may be based on different or a different combination of feedback factors. The process may determine a plurality of alignment scores of each entity for a plurality of respective features, such as to determine a set of alignment scores of entities for each feature. For example, in some embodiments, the process may determine a set of alignment scores for each of one or more features represented in the PGN.

In some embodiments, as explained herein, frames may be used to manage contexts within which participating entities provided feedback (e.g., in relation to features). For example, in looking at an evaluation, four frames (e.g., each of which may include respective features for evaluation) may be specified in a linear model. Each frame may correspond to a different contextual domain and may be represented in a data room that corresponds to an evaluation question that involves a determined score (e.g., based on the scores submitted by ranking entities and other factors), responses submitted, and rankings of the responses. In some example embodiments, evaluation templates structure a context within which alignment of entities participating in an evaluation process may be inferred. For example, evaluation questions may be "what is the priority of 'model feature X?'" and "does 'model feature X' satisfy system requirements?" and participating entities may respond as to what caused them to assign a particular score to the respective evaluation questions. Collective reasoning involves the participating entities who assigned high and low scores and responded with both high and low ranked responses. For example, an entity may score latency as a feature with high priority and score the feature based on an indicated latency metric as insufficient to satisfy latency requirements. Other participating entities may score latency with a lower priority and score the indicated latency metric as sufficient to satisfy latency requirements. Participating entities may provide different reasons for the respective scores they assigned. Additionally, the participating entities may rank responses submitted by other entities as reasons for assigned scores. This body of feedback collected from participating entities for the context, or frame, for latency may be processed to determine measurements of alignment among the participating entities for the feature. The evaluation questions may be considered as components of the feature in a linear model, and thus, in some embodiments a PGN that represents the collective reasoning (e.g., based on feedback) of the participating entities may be generated.

Feedback of an entity that is mapped in the PGN may be processed to determine an alignment score of the entity for the feature, e.g., based on how the entity scored a feature, which in the example context may be how the entity scored the latency metric as meeting, exceeding, or not satisfying system requirements, and how the entity ranked responses (e.g., reasons provided by other entities for their scores) associated with respective scores for the feature. The entity's evaluation of the feature may be scored based on feedback data, like that described above, collected from the entity and represented within the PGN, such as on a scale of 1-10 or 1-100, which may correspond to a scale for which the entity indicated their score for the feature. In some embodiments, the alignment score corresponding to the entity's prediction is a weighted sum based on the score for the feature and the scores of ranked ordered responses evaluated by the entity for the feature.

In some examples, a Bayesian model may be trained to learn the true ranking of responses from the sequence of rankings for a feature. At completion, the true ranking to be learned, 0, may represent the collective relevance ranking for the stimuli or evaluation question for the stimuli for participating entities. Similarly, a Bayesian model may be trained to learn a ranking of responses by an entity (e.g., even those which the entity did not rank). In some examples, a measure of distance between entity rank and true rank may be determined, and correspond to an alignment score (e.g., how closely the entity aligns with true rank). In some examples, such as those discussed herein, the distance may correspond to a degree which the entity aligns with the true rank. A minimization of the distance may correspond to a minimization of free energy between the entity and the true rank. A distribution based on such distances, thus, may indicate an amount of free energy that exceeds a threshold, like a measure of unresolved free energy that results from disagreement of the entities evaluations of the feature.

In some embodiments, the process determines 930 a distribution of alignment scores of the entities for a feature. The process may determine respective distribution of alignment scores based on respective sets of the scores for respective features. A distribution may thus be indicative of how closely ranking entities aligned in scoring of a feature based on their respective feedback.

In some embodiments, the process determines 940 one or more alignment measurements based on the distribution of entity alignment scores for a feature. As explained above, entity alignment for a plurality of features may be determined, each feature being associated with a corresponding distribution. FIG. 8B, for example, illustrates an example plot including distributions for respective features in an evaluation in accordance with the above techniques. A peak of a distribution may be centered on a score determined for its corresponding feature. For example, a score based on participating entity feedback for a feature B may be 70/100 (e.g., relatively favorable). However, the distribution for feature B, such as based on the width, or standard deviation of the distribution, may indicate a high degree of alignment, e.g., that the entities are tightly aligned in their feedback (e.g., a high concentration of similar scores or ranking distances) in evaluation of feature B. Here, unresolved free energy of the entities may be considered to be minimal (e.g., below a threshold). By contrast, the distribution for feature C, such as based on the width, or standard deviation of the distribution, may indicate a low degree of alignment, e.g., that the entities are loosely alignment in their feedback (e.g., a low concentration of similar scores or ranks, or divergent scoring or ranking camps distal to each other) in evaluation of feature C. Here, unresolved fee energy of the entities may be considered to be high (e.g., above a threshold). The distribution for feature A, as shown, may have a width or standard deviation that falls in between that of feature B and feature C, and thus the unresolved free energy may be considered between thresholds respectively indicative of a high degree and low degree of alignment, like a moderate alignment.

In some embodiments, the process generates 950 a visualization indicative of one or more of the measurements determined above, such as shown in FIG. 8B. The visualization and alignment metric scores (e.g., location of peak on scale, width, and height of peak) may be generated and displayed with a key, or other indicated correspondence to the respective features to which they correspond. In some examples, scaling of scoring distributions for different features may be normalized to a comparative context, or in some cases different scales may be used (e.g., 1-10, 1-100, yes-no-maybe, etc.). Thus, for example, the different distributions of respective features may be comparatively analyzed, visually, by a user in accordance with respective distribution properties. Alignment of participating entities for different features may thus be visually represented, such as to indicate which features ranking entities are in agreement upon in their scores and which features they are not. The width, e.g., distance to 1 SD from the peak of the distribution, and thus the height, may visually represent and contextualize the alignment of the ranking entities (or not) around a score for a feature among a plurality of other features. Some embodiments may classify one or more of the entities, a percentage of entities, or count of entities based on the above measurements.

Figure 10:
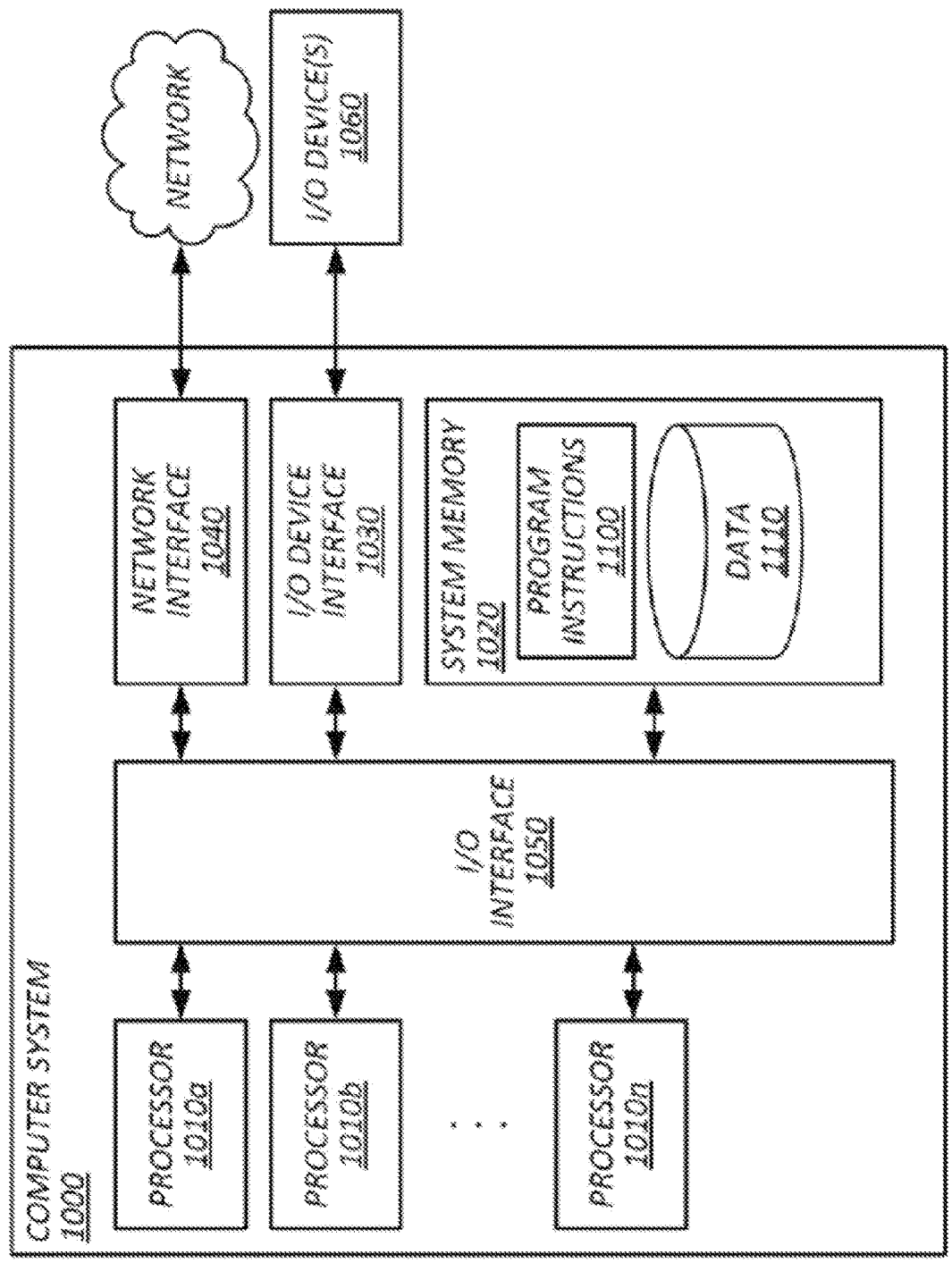
FIG. 10 is a physical architecture block diagram that shows an example of a computing device (or data processing system) by which some aspects of the above techniques may be implemented.

FIG. 10 is a physical architecture block diagram that shows an example of a computing device (or data processing system) by which some aspects of the above techniques may be implemented. Various portions of systems and methods described herein, may include or be executed on one or more computer systems similar to computing system 1000. Further, processes and modules or subsystems described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B may include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Example embodiments of disclosed techniques may include, but are not limited to:
1. An embodiment of a computer-implemented method comprising: obtaining a probabilistic graphical network model based on a time series data set of feedback received from respective entities of a plurality of entities for one or more features corresponding to an evaluation; obtaining observed data corresponding to a feature represented in the probabilistic graphical network model; training a machine learning model based on a benchmark training data set corresponding to the feature; determining, by the machine learning model, an observed score based on the observed data corresponding to the feature; determining a distribution of posterior predictions based on the probabilistic graphical network model, the distribution based on a posterior prediction determined for each entity based on respective feedback including one or more scores encoded by the probabilistic graphical network model; and determining, on a normalized scale, a distance between a peak of the distribution and the observed score, the distance being indicative of a bias of the entities for the feature.
2. An embodiment of a method, further comprising: inferring a cause of variation in assessments of the evaluation among the plurality of entities based on relevance probability distributions of reasons given by the plurality of entities for the assessments.
3. An embodiment of a method, such as embodiment 2, further comprising: ranking the reasons according to the respective reasons causal contribution to the variation in assessments of the evaluation among the plurality of entities.
4. An embodiment of a method, such as embodiment 2, further comprising: generating a graphical user interface displaying relative contribution of each of a plurality of reasons to the variation in assessments of the evaluation among the plurality of entities.
5. An embodiment of a method, such as embodiment 4, comprising sending instructions to display the graphical user interface to a remote client computer executing a web browser or native application in which the graphical user interface is to be displayed.
6. An embodiment of a method, such as embodiment 2, comprising obtaining the time series data via an integration with a video conferencing application and displaying a result indicative of the cause of variation in assessments of the evaluation among the plurality of entities in the video conferencing application to the plurality of entities.
7. An embodiment of a method, wherein: the plurality of entities comprises more than 10 entities; obtaining observed data corresponding to a feature represented in the probabilistic graphical network model comprising obtaining observed data corresponding to more than 10 features represented in the probabilistic graphical network model; and the probabilistic graphical network model comprises a Bayesian belief network.
8. An embodiment of a method, comprising: obtaining the probabilistic graphical model by executing an iterative process by which the plurality of entities engage in structured deliberation about the evaluation.
9. An embodiment of a method, wherein the probabilistic graphical model models reasons of the entities for results of the evaluation.
10. An embodiment of a method, wherein the evaluation implements a linear decision model of a decision to be made collectively by the plurality of entities.
11. An embodiment of a method, comprising: obtaining the feedback with a structured deliberation process integrated with team collaboration software; and causing the team collaboration software to display the plot of the set of distributions.
12. An embodiment of a method, wherein the probabilistic graphical model comprises a Bayesian belief network.
13. An embodiment of a method, wherein the probabilistic graphical model comprises a probabilistic graphical network.
14. An embodiment of a method, such as embodiment 13, wherein nodes of the probabilistic graphical network correspond to responses in the feedback from the plurality of entities and edges correspond to associations between the responses.
15. An embodiment of a method, such as embodiment 13, wherein nodes of the probabilistic graphical network correspond to themes in the feedback from the plurality of entities and edges correspond to associations between the themes.
16. An embodiment of a method, comprising: obtaining the feedback with steps for scaling A/B testing.
17. An embodiment of a method, comprising: obtaining the feedback with steps for sampling a semantic space.
18. An embodiment of a method, comprising: steps for determining measurements based on distributions determined based on the probabilistic graphical network model.
19. An embodiment of a method, wherein obtaining the probabilistic graphical model comprises steps for determining the probabilistic graphical model.
20. An embodiment of a tangible, non-transitory, machine-readable medium storing instructions that, when executed by a computer system, effectuate operations in accordance with one or more of the aforementioned embodiments 1-19.
21. An embodiment of a system comprising one or more processors and a memory, wherein the memory of the system is a non-transitory machine-readable medium and stores instructions that, when executed by one or more processors cause the system to effectuate operations in accordance with one or more of the aforementioned embodiments 1-19.

What is claimed is:
1. A computer-implemented method comprising:
obtaining a probabilistic graphical network model based on a data set including time series data for respective entities of a plurality of entities for one or more features corresponding to an evaluation;

obtaining observed data corresponding to a feature represented in the probabilistic graphical network model;

training a machine learning model based on a training data set of performance metrics corresponding to the feature;

determining, by the machine learning model, at least one score for observed performance or predicted performance based on the observed data corresponding to the feature;

determining a distribution of posterior predictions based on the probabilistic graphical network model, the distribution based on a posterior prediction determined for each entity based on respective time series data including one or more scores encoded by the probabilistic graphical network model; and determining, on a normalized scale, a distance between a peak of the distribution and at least one respective score of observed or predicted performance, the distance being indicative of an amount of observed or predicted error in evaluation of the feature by the entities.

2. The method of claim 1, further comprising:
inferring a contribution of one or more sources to variation in assessments of the feature by the plurality of entities based on probability distributions of at least some feedback in the time series data obtained from respective ones of the entities, the at least some feedback being associated with the feature.

3. The method of claim 2, further comprising:
ranking the one or more sources of variation according to the respective contribution to the variation in the feedback for the feature among the plurality of entities.

4. The method of claim 2, further comprising:
generating data corresponding to a graphical user interface for displaying relative contributions of each of the one or more sources to the variation in the feedback for the feature among the plurality of entities.

5. The method of claim 1, further comprising:
obtaining the time series data via integration with one or more applications by which one or more the plurality of the entities communicate with other ones of the entities over time.

6. The method of claim 5, further comprising:
obtaining the observed data via an integration with one or more sources of data indicative of performance of the feature, wherein the observed data comprises at least some observed performance metrics.

7. The method of claim 1, wherein:
the plurality of entities comprises more than 10 entities;
obtaining observed data corresponding to a feature represented in the probabilistic graphical network model comprising obtaining observed data corresponding to more than 10 features represented in the probabilistic graphical network model; and
the performance metrics comprise at least some benchmark or threshold performance metrics.

8. The method of claim 1, comprising:
obtaining the probabilistic graphical network model by executing an iterative process by which the plurality of entities engage in communications corresponding to the evaluation.

9. The method of claim 1, wherein the probabilistic graphical network model models responses of the entities to stimuli associated with the one or more features corresponding to the evaluation.

10. The method of claim 1, wherein the evaluation comprises implementing a linear decision model of a selection to be made collectively by a threshold number of the plurality of entities.

11. The method of claim 1, comprising:
obtaining the time series data for the plurality of entities with a structured deliberation process integrated with software by which at least some of the entities communicate with other ones of the entities; and
outputting, to a computing system of an entity, data corresponding to the amount of observed or predicted error in evaluation of the feature by at least the entity.

12. The method of claim 1, wherein the probabilistic graphical network model comprises an executable Bayesian belief network model representative of collective response of the plurality of entities to stimuli associated with the one or more features.

13. The method of claim 1, wherein the probabilistic graphical network model comprises a probabilistic graphical network of nodes.

14. The method of claim 13, wherein nodes of the probabilistic graphical network correspond to instances of feedback received from the plurality of entities in the time series data and edges correspond to associations between the instances of the received feedback.

15. The method of claim 13, wherein nodes of the probabilistic graphical network correspond to clusters of subsets of instances of feedback received from the plurality of entities in the time series data and edges correspond to associations between the clusters, wherein a subset of instances of received feedback is clustered based on at least one measure of distance being below a threshold.

16. The method of claim 1, comprising:
obtaining the time series data with steps for scaling A/B testing.

17. The method of claim 1, comprising:
obtaining the time series data with steps for sampling a semantic space.

18. The method of claim 1, comprising:
steps for determining measurements based on distributions determined based on the probabilistic graphical network model.

19. The method of claim 1, wherein obtaining the probabilistic graphical model comprises steps for determining the probabilistic graphical model.

20. A tangible, non-transitory, machine-readable medium storing instructions that, when executed by a computer system, effectuate operations comprising:
obtaining a probabilistic graphical network model based on a data set including time series data for respective entities of a plurality of entities for one or more features corresponding to an evaluation;
obtaining observed data corresponding to a feature represented in the probabilistic graphical network model;
training a machine learning model based on a training data set of performance metrics corresponding to the feature;
determining, by the machine learning model, at least one score for observed performance or predicted performance based on the observed data corresponding to the feature;
determining a distribution of posterior predictions based on the probabilistic graphical network model, the distribution based on a posterior prediction determined for each entity based on respective time series data including one or more scores encoded by the probabilistic graphical network model; and determining, on a normalized scale, a distance between a peak of the distribution and at least one respective score of observed or predicted performance, the distance being indicative of an amount of observed or predicted error in evaluation of the feature by the entities.

\* \* \* \* \*